Feb. 20, 1951 C. E. LOMAX ET AL 2,542,283

TELEPHONE SYSTEM

Filed March 5, 1947 14 Sheets-Sheet 1

INVENTORS
CLARENCE E. LOMAX
HANS SENGEBUSCH

BY Davis, Lindsey, Smith & Shonts

ATTORNEYS

Feb. 20, 1951 C. E. LOMAX ET AL 2,542,283

TELEPHONE SYSTEM

Filed March 5, 1947 14 Sheets-Sheet 2

INVENTORS
CLARENCE E. LOMAX
HANS SENGEBUSCH

BY

Davis, Lindsey, Smith & Shonts

ATTORNEYS

TELEPHONE SYSTEM

Filed March 5, 1947 14 Sheets-Sheet 3

INVENTORS
CLARENCE E. LOMAX
HANS SENGEBUSCH
BY
Davis, Lindsey, Smith & Shonts
ATTORNEYS INVENTORS
CLARENCE E. LOMAX
BY HANS SENGEBUSCH
Davis, Lindsey, Smith & Shonts
ATTORNEYS INVENTORS
CLARENCE E. LOMAX
HANS SENGEBUSCH
BY
Davis, Lindsey, Smith & Shonts
ATTORNEYS Feb. 20, 1951 C. E. LOMAX ET AL 2,542,283

TELEPHONE SYSTEM

Filed March 5, 1947 14 Sheets-Sheet 6

INVENTORS
CLARENCE E. LOMAX
HANS SENGEBUSCH

BY Davis, Lindsey, Smith & Shonts
ATTORNEYS

INVENTORS
CLARENCE E. LOMAX
HANS SENGEBUSCH
BY
Davis, Lindsey, Smith & Shonts
ATTORNEYS INVENTORS
CLARENCE E. LOMAX
HANS SENGEBUSCH
BY
Davis, Lindsey, Smith & Shonts
ATTORNEYS

TELEPHONE SYSTEM

Filed March 5, 1947 14 Sheets-Sheet 9

INVENTORS
CLARENCE E. LOMAX
HANS SENGEBUSCH
BY
Davis, Lindsey, Smith & Shonts
ATTORNEYS

TELEPHONE SYSTEM

Filed March 5, 1947 14 Sheets-Sheet 10

INVENTORS
CLARENCE E. LOMAX
HANS SENGEBUSCH
BY
Davis, Lindsey, Smith & Shonts
ATTORNEYS Feb. 20, 1951 C. E. LOMAX ET AL 2,542,283

TELEPHONE SYSTEM

Filed March 5, 1947 14 Sheets-Sheet 11

INVENTOR.
CLARENCE E. LOMAX
HANS SENGEBUSCH

BY Davis, Lindsey, Smith & Shonts

ATTORNEYS.

Feb. 20, 1951 C. E. LOMAX ET AL 2,542,283

TELEPHONE SYSTEM

Filed March 5, 1947 14 Sheets-Sheet 12

INVENTOR.
CLARENCE E. LOMAX
HANS SENGEBUSCH

BY

Davis, Lindsey, Smith & Shonts
ATTORNEYS

*INVENTOR.*
CLARENCE E. LOMAX
HANS SENGEBUSCH

*BY*

Davis, Lindsay, Smith & Shonts

ATTORNEYS

Feb. 20, 1951 C. E. LOMAX ET AL 2,542,283

TELEPHONE SYSTEM

Filed March 5, 1947 14 Sheets-Sheet 14

INVENTOR.
CLARENCE E. LOMAX
HANS SENGEBUSCH

BY Davis, Lindsey, Smith & Shonts

ATTORNEYS

Patented Feb. 20, 1951

2,542,283

UNITED STATES PATENT OFFICE 2,542,283

TELEPHONE SYSTEM

Clarence E. Lomax, Chicago, and Hans Sengebusch, Villa Park, Ill., assignors to Automatic Electric Laboratories, Inc., Chicago, Ill., a corporation of Delaware Application March 5, 1947, Serial No. 732,417

13 Claims. (Cl. 179—18)

The present invention relates to telephone systems and more particularly to improved switching apparatus for setting up telephone connections.

It is an object of the present invention to provide an automatic telephone system including finders, selectors and connectors, each comprising improved switching apparatus of economical construction and arrangement.

Another object of the invention is to provide switching apparatus of the character mentioned comprising an improved group switch and an improved unit switch.

Another object of the invention is to provide a group switch of the character mentioned of improved mechanical construction and arrangement.

A further object of the invention is to provide in a selector improved switching apparatus of the type noted, wherein the group switch is arranged to respond directly to a digit transmitted over the associated trunk in order to perform a group selection and the unit switch is arranged to carry out a trunk-hunting operation in order to perform a unit selection.

A further object of the invention is to provide in a connector improved switching apparatus of the type noted, wherein the group switch and the unit switch are arranged to respond directly and successively to two digits transmitted over the associated trunk in order to perform successively group and unit selections.

A further object of the invention is to provide in a finder improved switching apparatus of the type noted, wherein the group switch and the unit switch are arranged to be operated respectively directly in accordance with the group and the unit positions of a calling subscriber line in order to perform the corresponding group and unit selections.

A still further object of the invention is to provide in a telephone system an improved overflow trunking arrangement utilizing selectors incorporating switching apparatus of the character described.

Further features of the invention pertain to the particular arrangement of the circuit elements of the system, whereby the above outlined and additional operating features thereof are attained.

Figure 1:
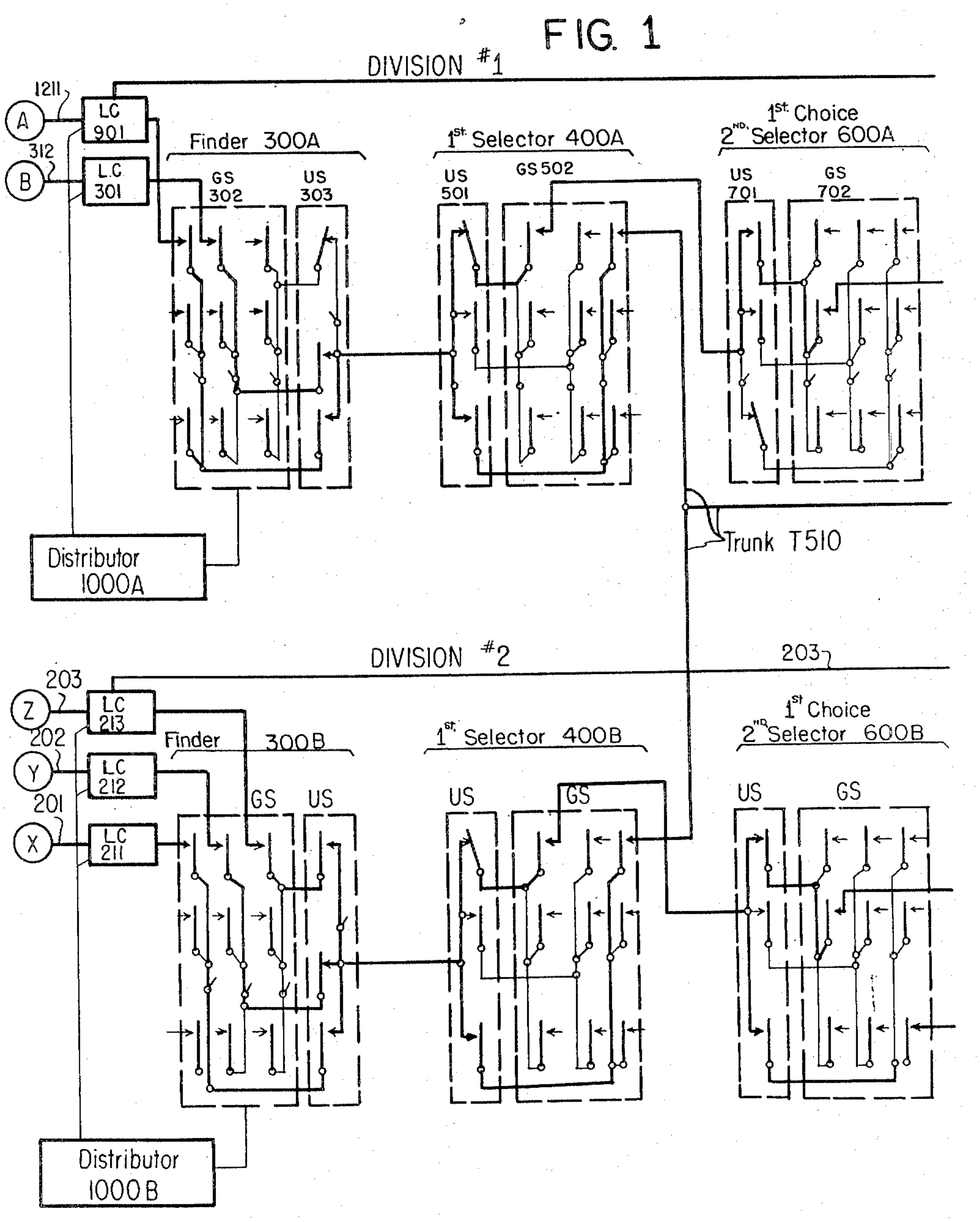
Figure 2:
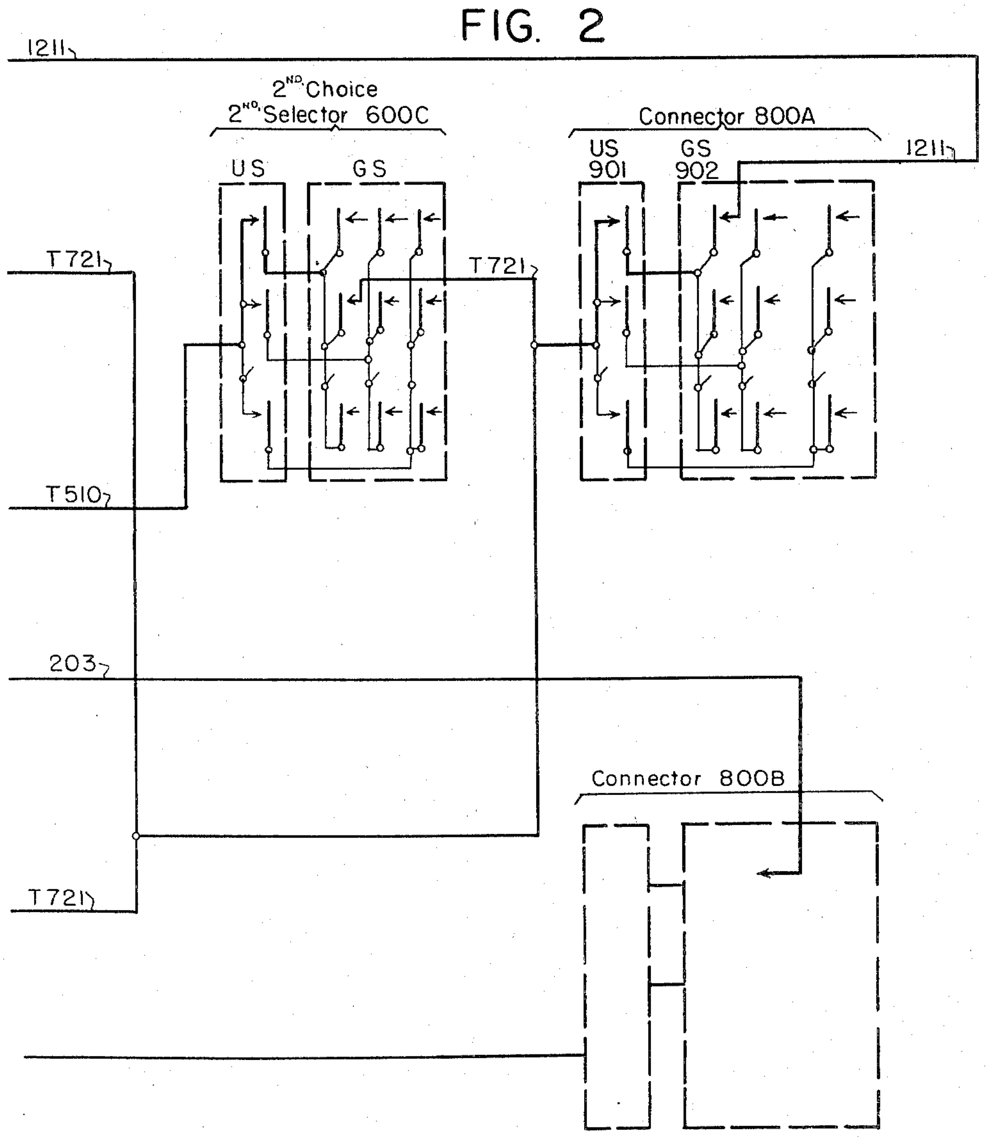
Figure 16:
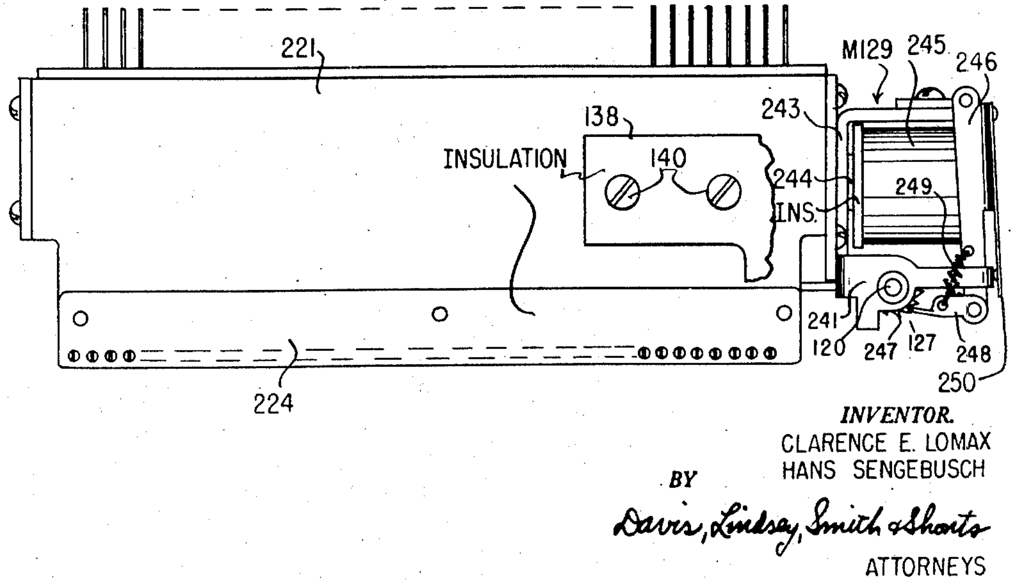
Figure 17:
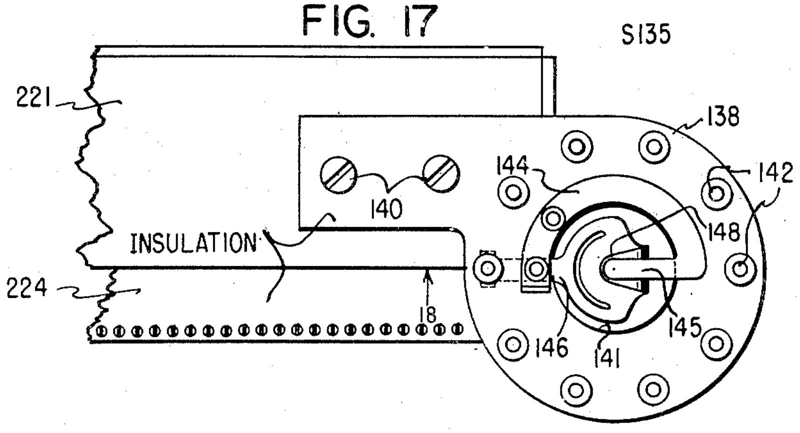
Figure 18:
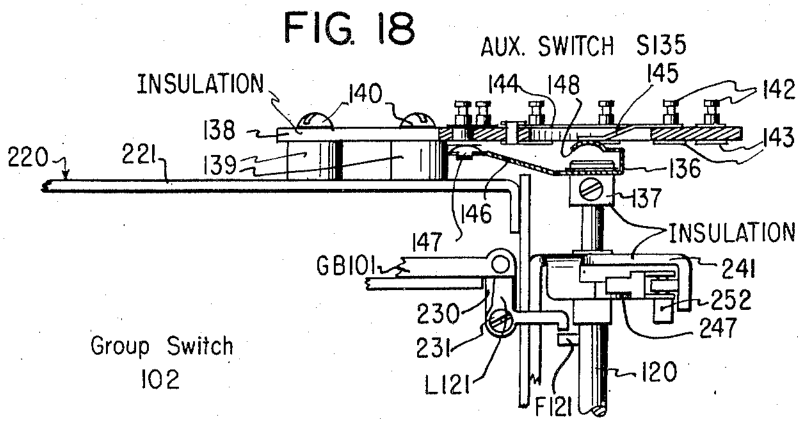

The invention, both as to organization and method of operation, together with further objects and changes thereof, will best be understood by reference to the following specification taken in connection with the accompanying drawings in which Figures 1 and 2, taken together, illustrate diagrammatically a telephone system having incorporated therein the features of the present invention; Figs. 3 to 10, inclusive, taken together, illustrate the details of a portion of the telephone system illustrated in Figs. 1 and 2 and embodying the features of the present invention; and Figs. 11 to 16, inclusive, and 19 illustrate the mechanical construction and arrangement of a group switch incorporated in finders, selectors and connectors employed in the telephone system; and Figs. 17 and 18 illustrate the mechanical construction and arrangement of an auxiliary switch incorporated in the group switches employed in the finders utilized in the telephone system.

More particularly, in order to form a unified diagram, Figs. 1 and 2 should be arranged from left to right in side-by-side relation. Also, in order to form a unified diagram, Figs. 3 to 9, inclusive, should be arranged from left to right in end-to-end relation; and Fig. 10 should be arranged sidewise and disposed below Fig. 3.

Figure 11:
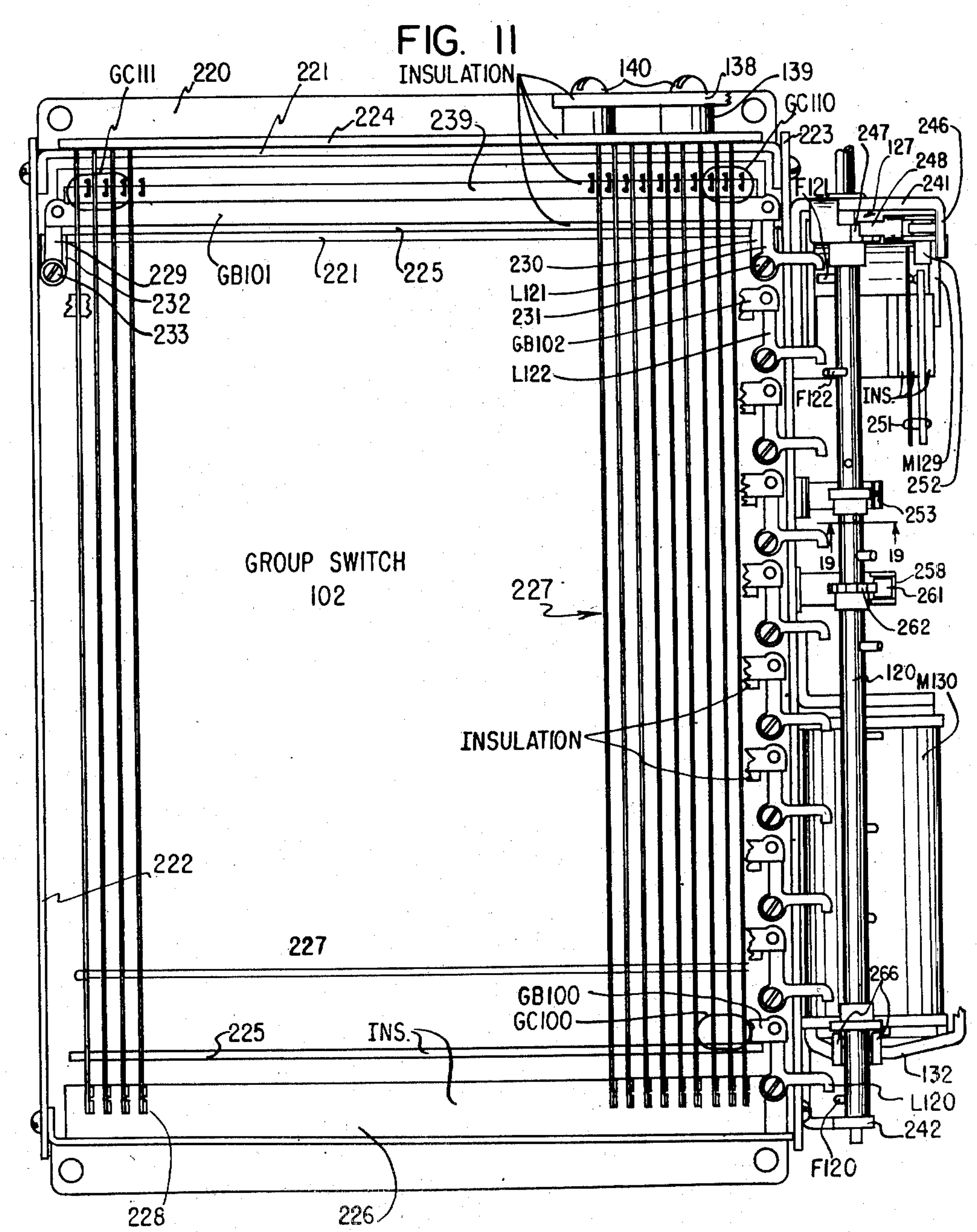
Figure 12:
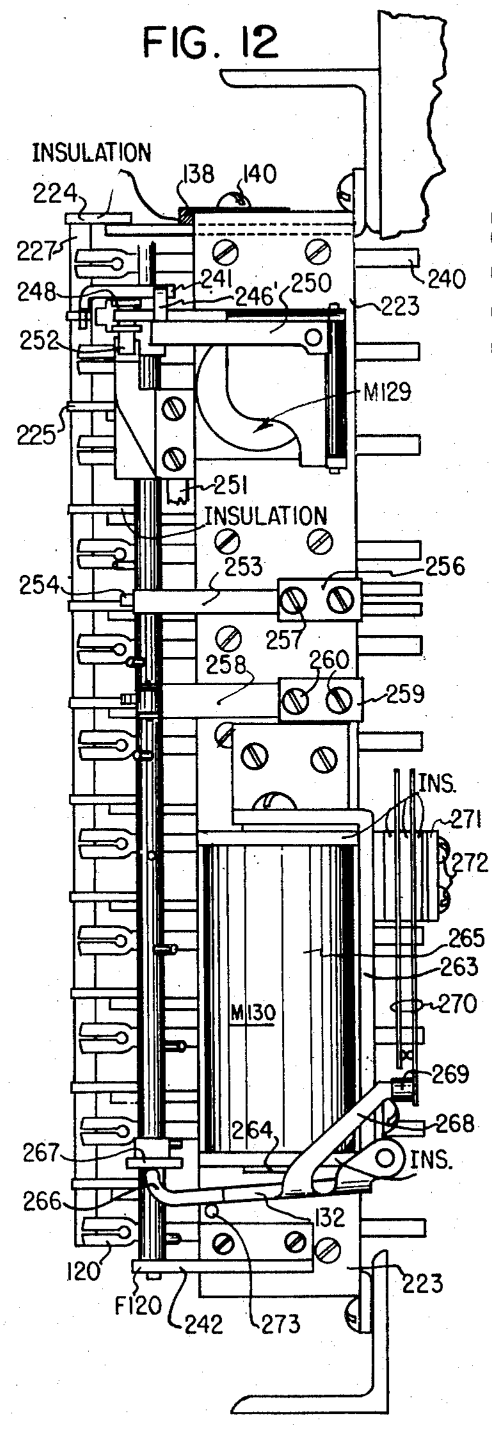
Figure 13:
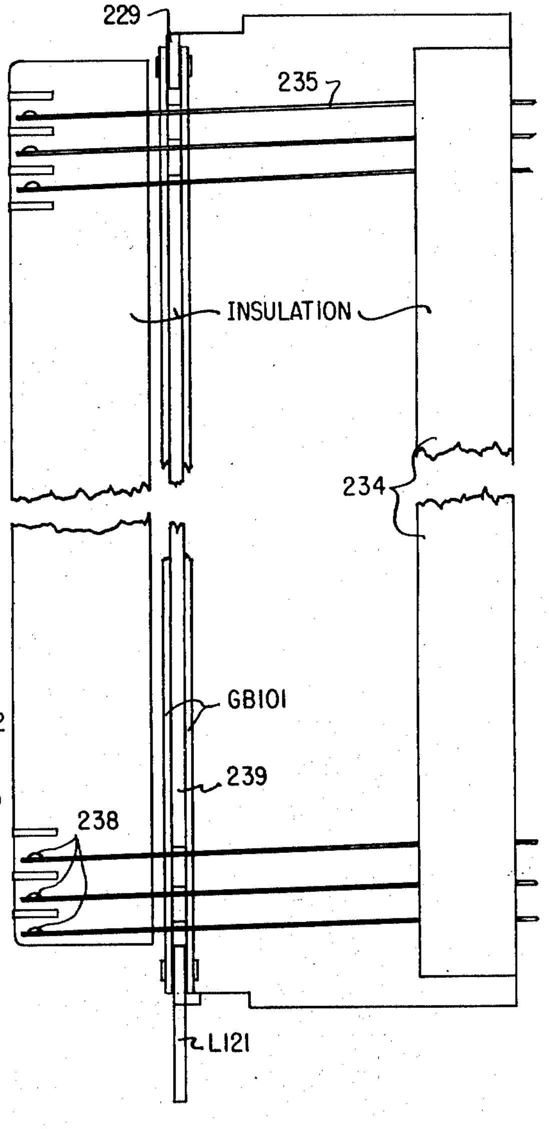
Figure 14:
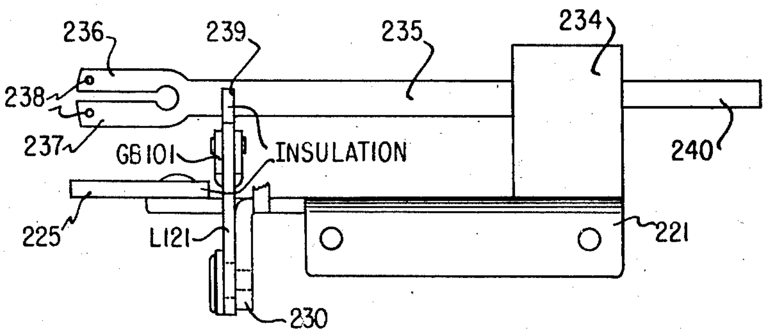
Figure 15:
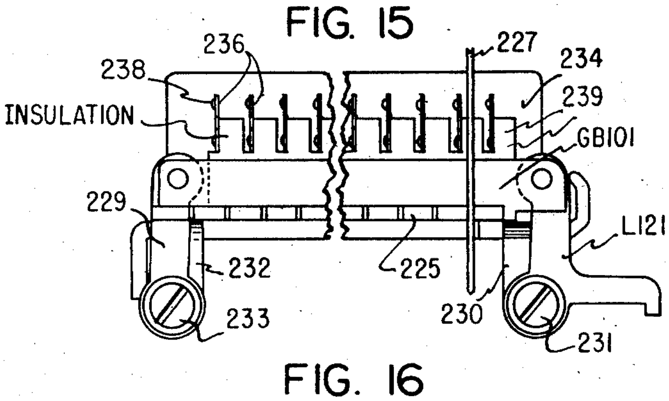
Figure 19:
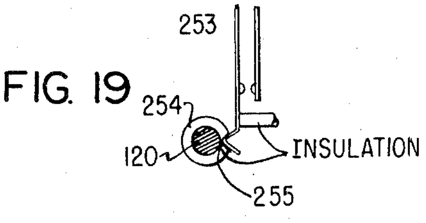

More particularly, Fig. 11 is a front elevational view, partly broken away, of the group switch mentioned; Fig. 12 is a side elevational view, partly broken away, of the group switch shown in Fig. 11, together with a portion of the associated support; Fig. 13 is an enlarged, framentary plan view of one of the operating mechanisms for one of the groups of contact sets incorporated in the group switch shown in Figs. 11 and 12; Fig. 14 is an enlarged, side elevational view of the operating mechanism shown in Fig. 13; Fig. 15 is an enlarged, fragmentary front elevational view of the operating mechanism shown in Figs. 13 and 14; Fig. 16 is a plan view, partly broken away, of the group switch shown in Figs. 11 and 12; Fig. 17 is an enlarged plan view of the auxiliary switch incorporated in the group switch employed in the finder mentioned; Fig. 18 is a side elevational view, partly in section taken along the line 18—18 in Fig. 17, of the auxiliary switch; and Fig. 19 is a sectional view, taken along the line 19—19 in Fig. 11, of a portion of the group switch shown in Figs. 11, 12 and 16, and illustrating the details of a rotary off-normal contact spring assembly incorporated therein.

Referring now, more particularly, to Figs. 1 and 2 of the drawings, there is illustrated an automatic telephone system comprising an exchange terminating several thousand subscriber lines arranged in two divisions, #1 and #2. Division #1 includes the subscriber lines 1211 and 312 respectively extending to the subscriber substations A and B; while division #2 includes the subscriber lines 201, 202 and 203 respectively extending to the subscriber substantions X, Y and Z. Each subscriber line is provided with a line circuit individual thereto, the line circuits 901, 301, 211, 212 and 213 being respectively individual to the subscriber lines 1211, 312, 201, 202 and 203. Also, the system comprises switching apparatus disposed in the two divisions and including finders, first selectors, second selectors and connectors.

The subscriber lines 1211 and 312 are disposed in the twelfth 100-line group in dvision #1 and are provided with a group of finders, including the finder 300A, and a group of connectors, including the connector 800A. Also, division #1 includes a plurality of groups of first selectors; one of the groups, including the first selector 400A, being associated with the group of finders, including the finder 300A. Further, division #1 includes a plurality of groups of second selectors one of the groups including the second selector 600A; as well as the second selector 600C. In the arrangement the finder 300A has access to the twelfth 100-line group, including the subscriber lines 1211 and 312, and is individually associated with the first selector 400A. Also, the first selector 400A has access to the second selector 600A as well as to the second selector 600C. Finally, both the second selector 600A and the second selector 600C have access to the connector 800A; while the connector 800A has access to the twelfth 100-line group, including the subscriber lines 1211 and 312. Further, each 100-line group is provided with a distributor individual thereto that is associated with the corresponding group of finders; the distributor 1000A being individual to the twelfth 100-line group, including the subscriber lines 1211 and 312, and being associated with the group of finders, including the finder 300A.

Similarly, the subscriber lines 201, 202 and 203 are disposed in a given 100-line group in division #2 and are provided with a group of finders, including the finder 300B, and a group of connectors, including the connector 800B. Also, division #2 includes a plurality of groups of first selectors; one of the groups, including the first selector 400B, being associated with the group of finders, including the finder 300B. Further, division #2 includes a plurality of groups of second selectors, one of the groups including the second selector 600B; as well as the second selector 600C; whereby the second selector 600C is common to divisions #1 and #2. In the arrangement the finder 300B has access to the 100-line group, including the subscriber lines 201, 202 and 203, and is individually associated with the first selector 400B. Also, the first selector 400B has access to the second selector 600B as well as to the second selector 600C. Finally, both the second selector 600B and the second selector 600C have access to the connector 800B; while the connector 800B has access to the 100-line group, including the subscriber lines 201, 202 and 203. Further, each of the 100-line groups is provided with a distributor individual thereto that is associated with the corresponding group of finders; the distributor 1000B being individual to the 100-line group, including the subscriber lines 201, 202 and 203, and being associated with the group of finders, including the finder 300B.

In view of the foregoing description of the arrangement of the switching apparatus in divisions #1 and #2, it will be understood that the first selector 400A has first choice access to the group of second selectors, including the second selector 600A, and second choice or overflow access to the second selector 600C. Likewise, the first selector 400B has first choice access to the group of second selectors, including the second selector 600B, and second choice or overflow access to the second selector 600C. Accordingly, in the extension of a connection from a subscriber substation in division #1, such, for example, as the subscriber substation B, to another subscriber substation in division #1, such, for example, as the subscriber substation A, the distributor 1000A may allot the finder 300A to the calling subscriber substation B. Then the first selector 400A is operated to select an idle one of the second selectors in the group, including the second selector 600A, or to select the second selector 600C in the dual events that all of the second selectors in the group, including the second selector 600A, are busy and the second selector 600C is idle. Thereafter, either the second selector in the group, including the second selector 600A, or the second selector 600C may be controlled to select an idle connector in the group, including the connector 800A; whereupon the connector mentioned may be controlled to seize the subscriber line 1211 extending to the called subscriber substation A.

Similarly, in the extension of a connection from a subscriber substation in division #2, such, for example, as the subscriber substation X, to a subscriber substation in division #1, such, for example, as the subscriber substation A, the distributor 1000B may allot the finder 300B to the calling subscriber substation X. Then the first selector 400B is operated to select an idle one of the second selectors in the group, including the second selector 600B, or to select the second selector 600C in the dual events that all of the second selectors in the group, including the second selector 600B, are busy and the second selector 600C is idle. Thereafter, either the second selector in the group, including the second selector 600B, or the second selector 600C may be controlled to select an idle connector in the group, including the connector 800A; whereupon the connector mentioned may be controlled to seize the subscriber line 1211 extending to the called subscriber substation A.

Figure 3:
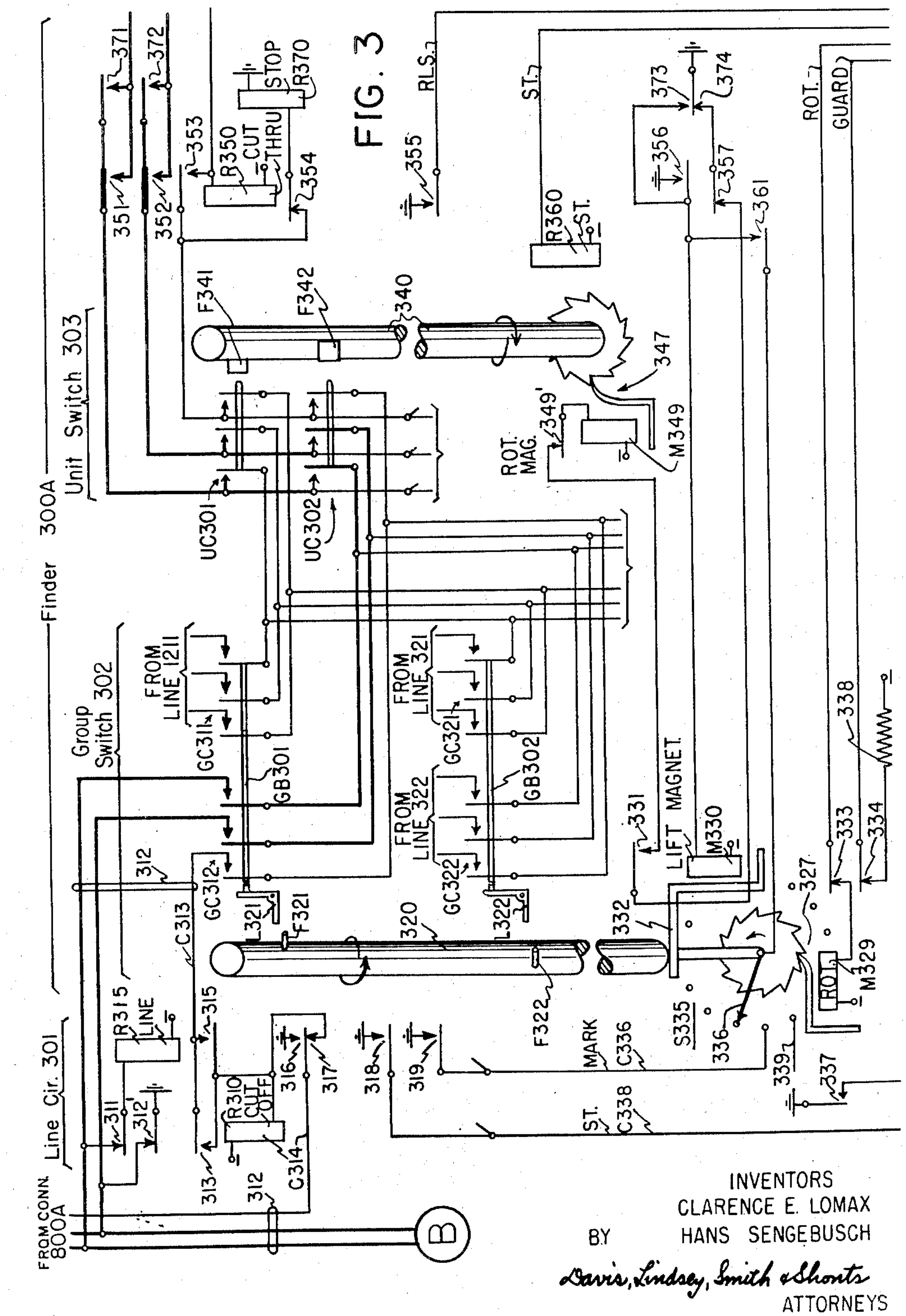

Preferably, the line circuits 301, 901, etc. are identical; the line circuit 301 comprising, as shown in Fig. 3, a line relay R315 and a cutoff relay R310.

Preferably, each of the finders is identical to the finder 300A which comprises, as shown in Fig. 3, a group switch 302 and a unit switch 303, as well as a relay group including a cut-through relay R350, a start relay R360 and a stop relay R370.

The group switch 302 is of the construction and arrangement illustrated in Figs. 11, etc. and described more fully hereinafter. Specifically, the group switch 302 comprises one hundred group contact sets GC311 to GC300, inclusive, arranged in ten groups of ten group contact sets each; and ten group members or bars GB301 to GB300, inclusive, respectively associated with the ten groups of group contact sets. Also, the group switch 302 comprises an operating element 320 mounted for both rotary movement and longitudinal sliding movement and having no rotary home position, but a longitudinal home position; and carrying ten operating lugs or fingers F321 to F320, inclusive. The operating fingers F321, etc., are disposed in longitudinal and angular spaced apart relation, whereby the fingers F321, F322, etc. are disposed in a helical path about the operating element 320. The ten operating fingers F321, etc. are respectively associated with the ten group bars GB301, etc. through the intermediary of a group of ten pivotally mounted bell cranks L321 to L320, inclusive, respectively positioned therebetween. Further the group switch 302 is provided with a rotary magnet M329 having an associated pawl and ratchet mechanism 327 operatively connected to the operating element 320; as well as a lift magnet M330 having an associated armature 332 operatively connected to the operating element 320.

The unit switch 303 comprises ten unit contact sets UC301 to UC300, inclusive, terminating a group of ten busses commonly associated with the ten groups of group contact sets in the group switch 302. Also, the unit switch 303 comprises an operating element 340 mounted for rotation and carrying ten operating lugs or fingers F341 to F340, inclusive. The operating fingers F341, etc. are disposed in longitudinal and angular spaced apart relation, whereby the fingers F341, F342, etc. are disposed in a helical path about the operating element 340. The ten operating fingers F341, etc. are respectively associated with the ten unit contact sets UC301, etc. Further, the unit switch 303 is provided with a rotary magnet M349 having an associated pawl and ratchet mechanism 347 operatively connected to the operating element 340. The operating element 340 has no home position and is adapted to occupy any one of its ten rotary stepped positions, thereby to operate the associated one of the unit contact sets UC301, etc.

Finally, an auxiliary switch S335, of the construction of that shown in Figs. 17 and 18 and described hereinafter, is operatively connected to the group switch 302. Specifically, the auxiliary switch S335 essentially comprises a wiper 336 mounted upon the operating element 320 of the group switch 302 and capable of rotation therewith; the wiper 336 being provided with an associated contact bank terminating ten mark conductors C336, etc. respectively extending to the ten subgroups of ten lines each in the twelfth 100-line group, including the subscriber line 312 extending to the subscriber substation B.

Figure 4:
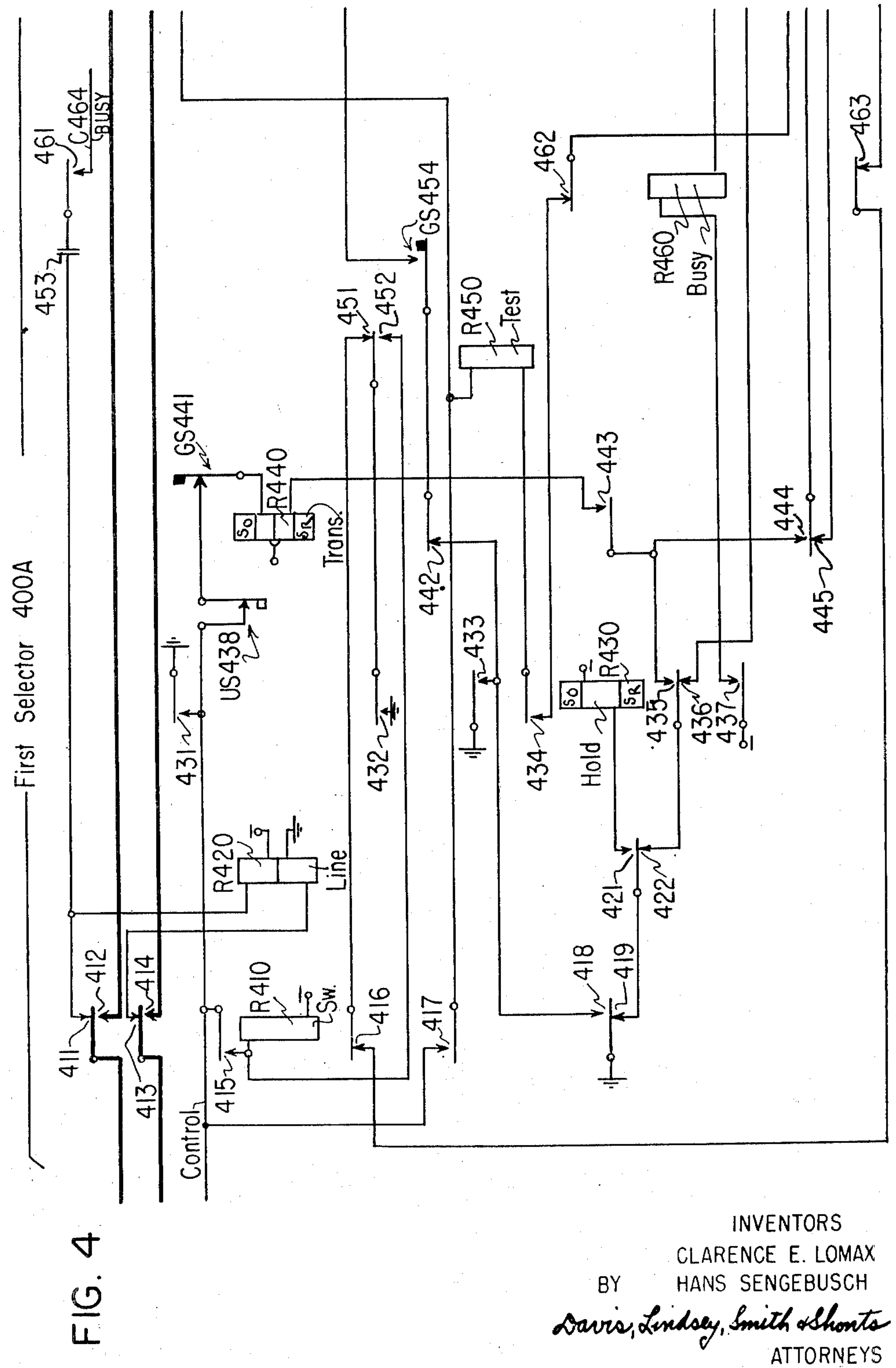
Figure 5:
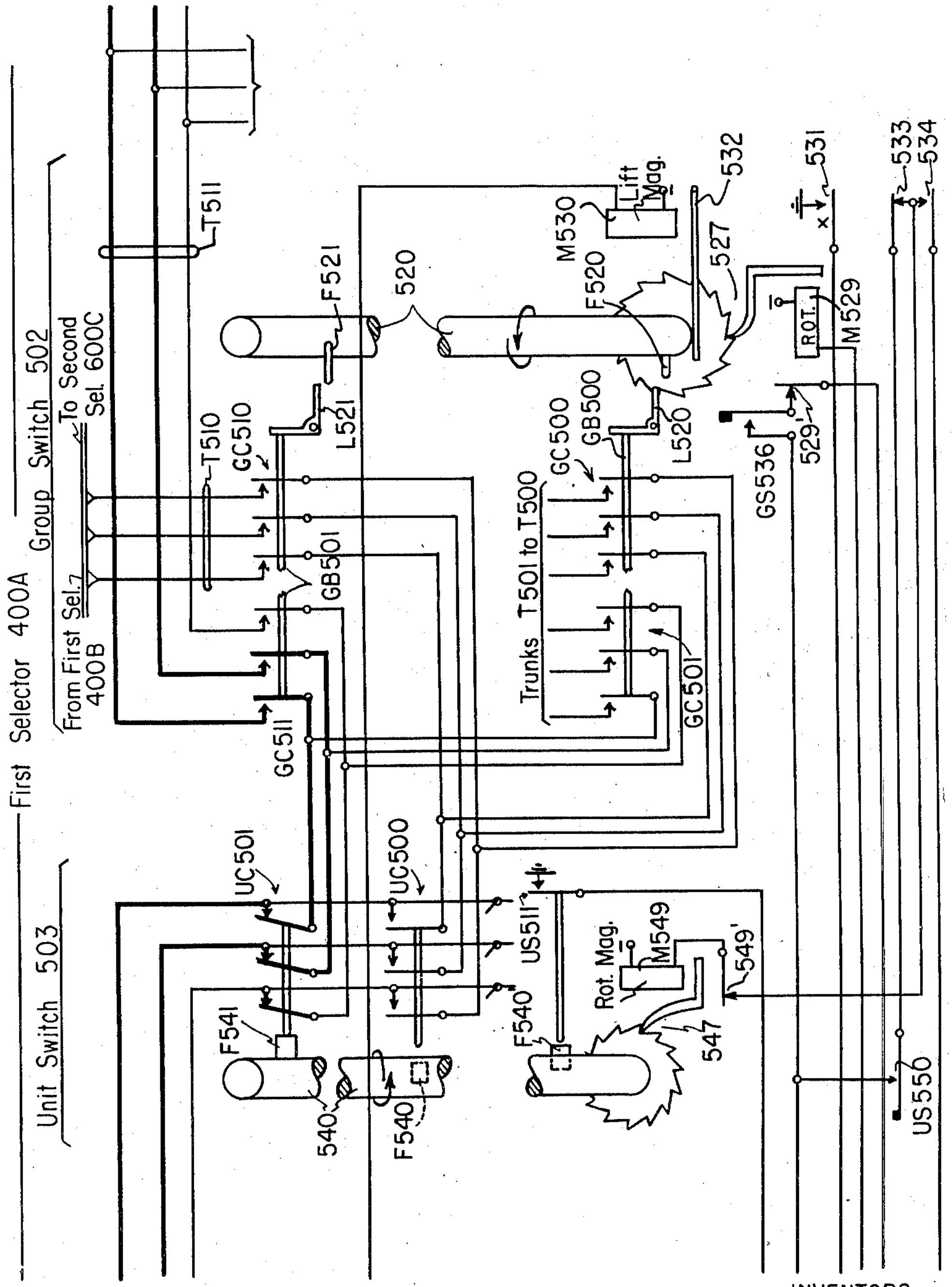

Preferably, each of the first selectors is identical to the first selector 400A which comprises, as shown in Figs. 4 and 5, a group switch 502 and a unit switch 503, as well as a relay group including a switch relay R410, a line relay R420, a hold relay R430, a transfer relay R440, a test relay R450 and a busy relay R460.

The group switch 502 is of the construction and arrangement illustrated in Figs. 11, etc. and described more fully hereinafter. Specifically, the group switch 502 comprises one hundred group contact sets GC511 to GC509, inclusive, arranged in ten groups of ten group contact sets each; and ten group members or bars GB501 to GB500, inclusive, respectively associated with the ten groups of group contact sets. Also, the group switch 502 comprises an operating element 520 mounted for both rotary movement and longitudinal sliding movement and having rotary and longitudinal home positions; and carrying ten operating lugs or fingers F521 to F520, inclusive. The operating fingers F521, etc. are disposed in longitudinal and angular spaced apart relation, whereby the fingers F521, F522, etc. are disposed in a helical path about the operating element 520. The ten operating fingers F521, etc. are respectively associated with the ten group bars GB501, etc. through the intermediary of a group of pivotally mounted bell cranks L521 to L520, inclusive, respectively positioned therebetween. Further, the group switch 502 is provided with a rotary magnet M529 having an associated pawl and ratchet mechanism 527 operatively connected to the operating element 520; as well as a lift magnet M530 having an associated armature 532 operatively connected to the operating element 520.

The unit switch 503 comprises ten unit contact sets UC501 to UC500, inclusive, terminating a group of ten busses commonly associated with the ten groups of group contact sets in the group switch 502. Also, the unit switch 503 comprises an operating element 540 mounted for rotation and carrying eleven operating fingers or lugs F541 to F540, inclusive, and F540'. The operating fingers F541, etc. are disposed in longitudinal and angular spaced apart relation, whereby the ten fingers F541 to F540, inclusive, and the eleventh finger F540' are disposed in a helical path about the operating element 540. The ten operating fingers F541 to F540, inclusive, are respectively associated with the ten unit contact sets UC501 to UC500, inclusive; while the eleventh finger F540' is associated with a set of switch springs US511 utilized for a purpose more fully explained hereinafter. Further, the unit switch 503 is provided with a rotary magnet M549 having an associated pawl and ratchet mechanism 547 operatively connected to the operating element 540. The operating element 540 has a home position wherein it occupies its first position, thereby to operate the associated first unit contact set UC501.

Also associated with the group switch 502 are the sets of switch springs GS441, GS454 and GS536 which are actuated in response to rotation of the operating element 520 in the rotary direction away from its home position. Similarly, associated with the unit switch 503 are the sets of switch springs US438 and US550 which are actuated in response to rotation of the operating element 540 in the rotary direction away from its home position.

Figure 6:
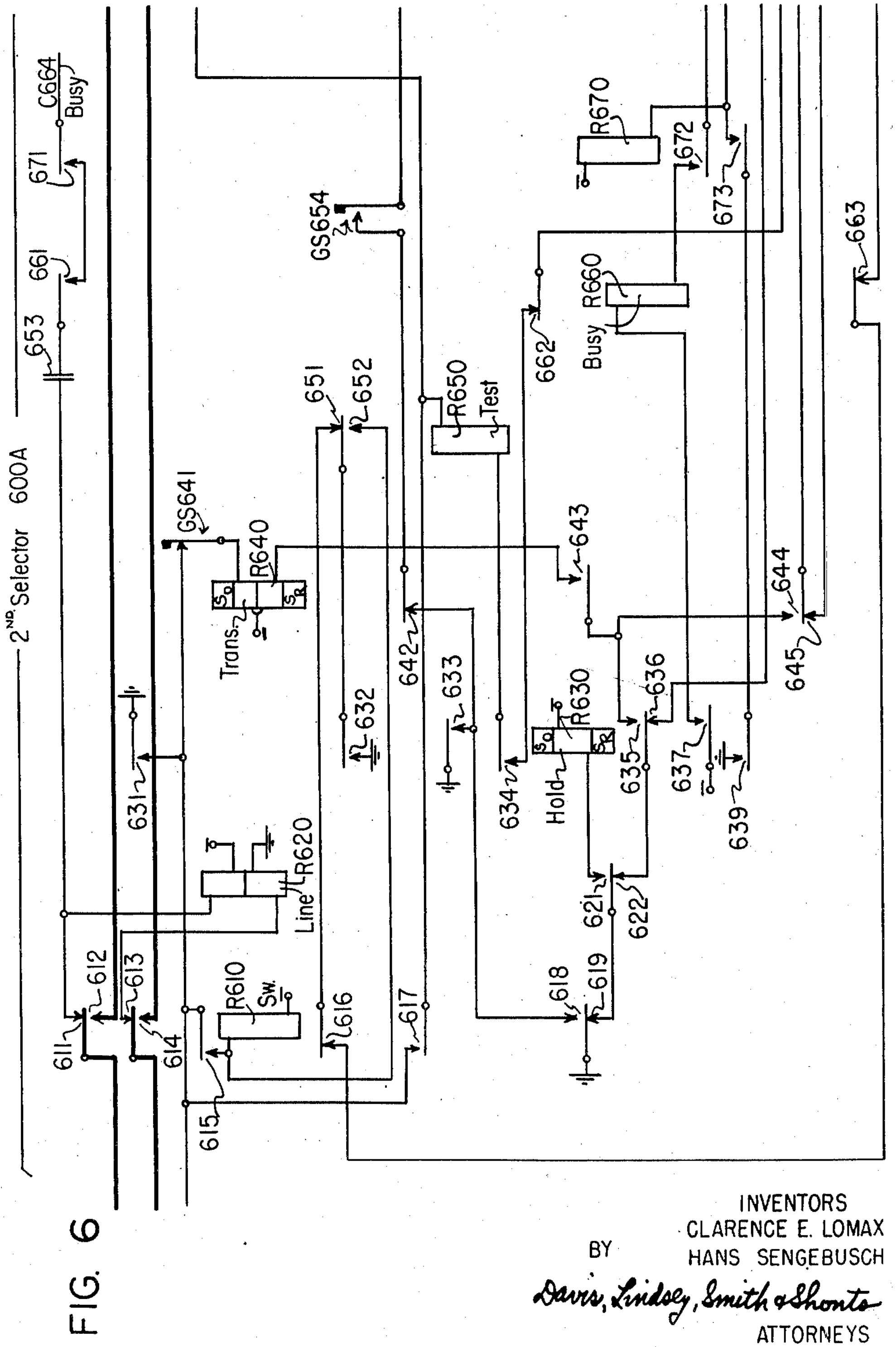
Figure 7:
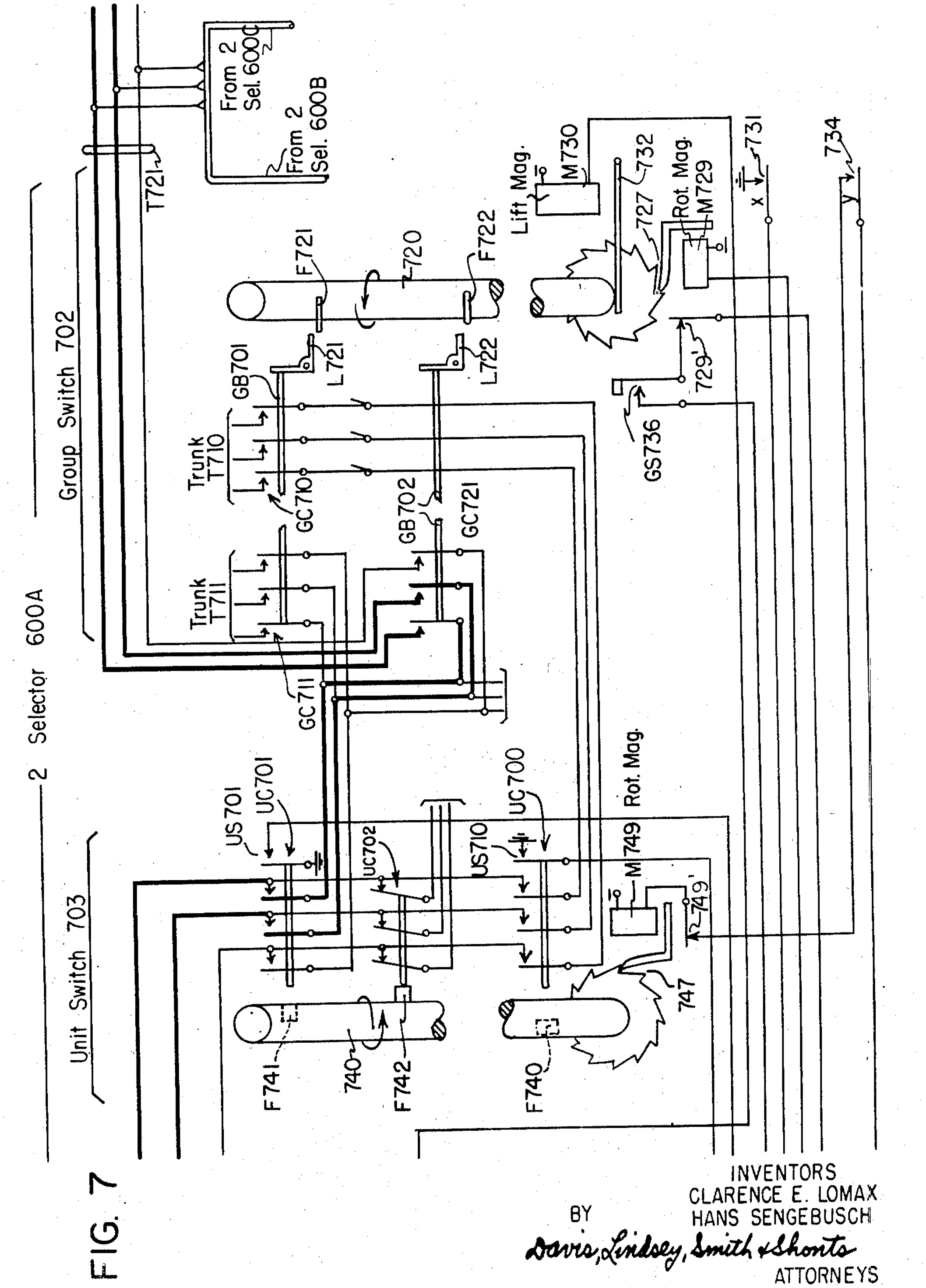

Preferably, each of the second selectors is identical to the second selector 600A which comprises, as shown in Figs. 6 and 7, a group switch 702 and a unit switch 703, as well as a relay group including a switch relay R610, a line relay R620, a hold relay R630, a transfer relay R640, a test relay R650, a busy relay R660 and a control relay R670.

The group switch 702 is of the construction and arrangement illustrated in Figs. 11, etc. and described more fully hereinafter. Specifically, the group switch 702 comprises one hundred group contact sets GC711 to GC700, inclusive, arranged in ten groups of ten group contact sets each; and ten group members or bars GB701 to GB700, inclusive, respectively associated with the ten groups of group contact sets. Also, the group switch 702 comprises an operating element 720 mounted for both rotary movement and longitudinal sliding movement and having rotary and longitudinal home positions; and carrying ten operating lugs or fingers F721 to F720, inclusive. The operating fingers F721, etc. are disposed in longitudinal and angular spaced apart relation, whereby the fingers F721, F722, etc. are disposed in a helical path about the operating element 720. The ten operating fingers F721, etc., are respectively associated with the ten group bars GB701, etc., through the intermediary of a group of pivotally mounted bell cranks L721 to L720, inclusive, respectively positioned therebetween. Further, the group switch 702 is provided with a rotary magnet M729 having an associated pawl and ratchet mechanism 727 operatively connected to the operating element 720; as well as a lift magnet M730 having an associated armature 732 operatively connected to the operating element 720.

The unit switch 703 comprises ten unit contact sets UC701 to UC700, inclusive, terminating a group of ten busses commonly associated with the ten groups of group contact sets in the group switch 702. Also, the unit switch 703 comprises an operating element 740 mounted for rotation and carrying ten operating fingers or lugs F741 to F740, inclusive. The operating fingers F741, etc. are disposed in longitudinal and angularly spaced apart relation; whereby the fingers F741, etc. are disposed in a helical path about the operating element 740. The ten operating fingers F741 to F740, inclusive, are respectively associated with the ten unit contact sets UC701 to UC700, inclusive. Further, the unit switch 703 is provided with a rotary magnet M749 having an associated pawl and ratchet mechanism 747 operatively connected to the operating element 740. The operating element 740 has no home position and is adapted to occupy any one of its ten rotary stepped positions, thereby to operate the associated one of the unit contact sets UC701, etc.

Also, associated with the group switch 702 are the sets of switch springs GS641, GS654 and GS736, which are actuated in response to rotation of the operating element 720 in the rotary direction away from its home position.

Figure 8:
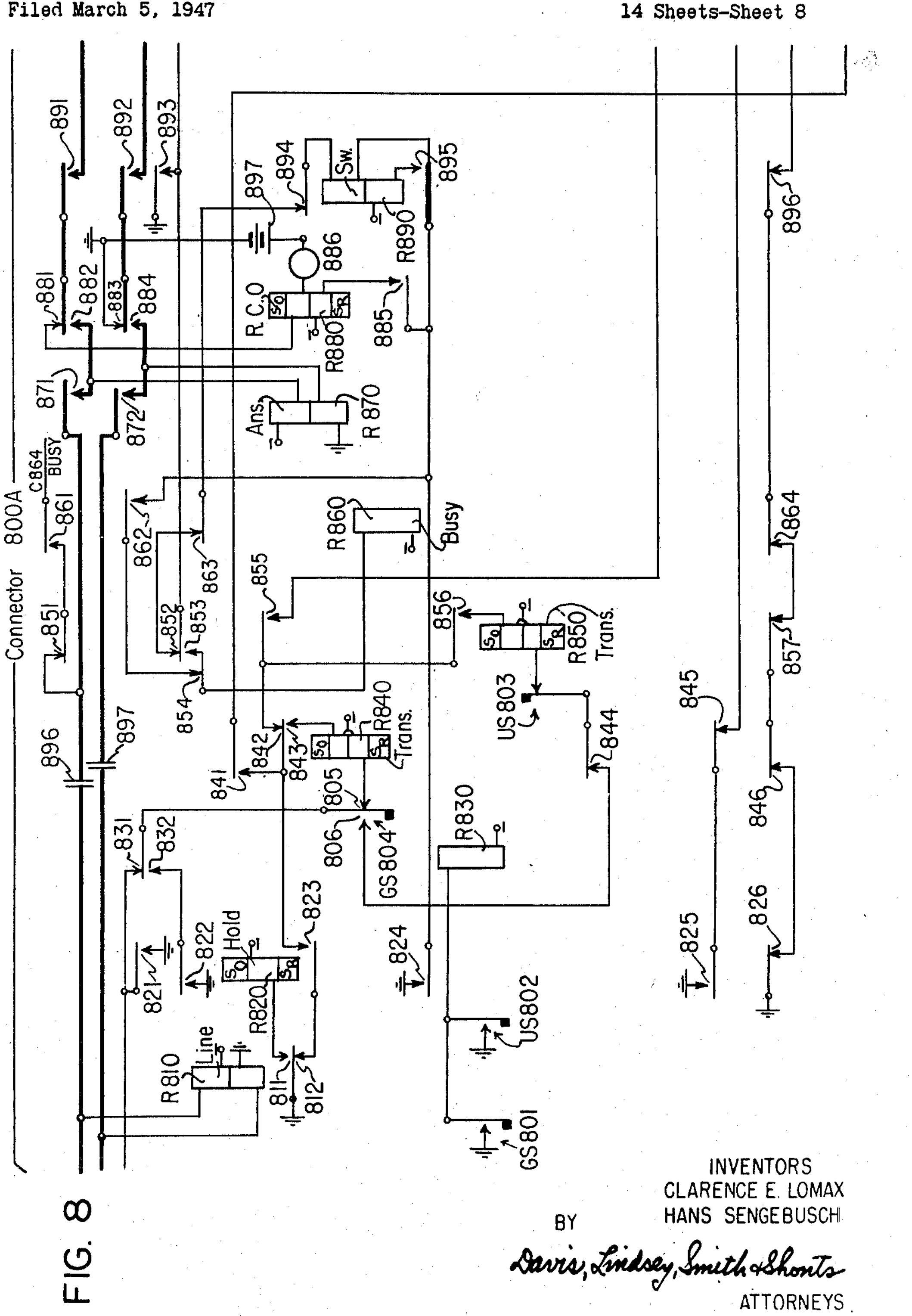
Figure 9:
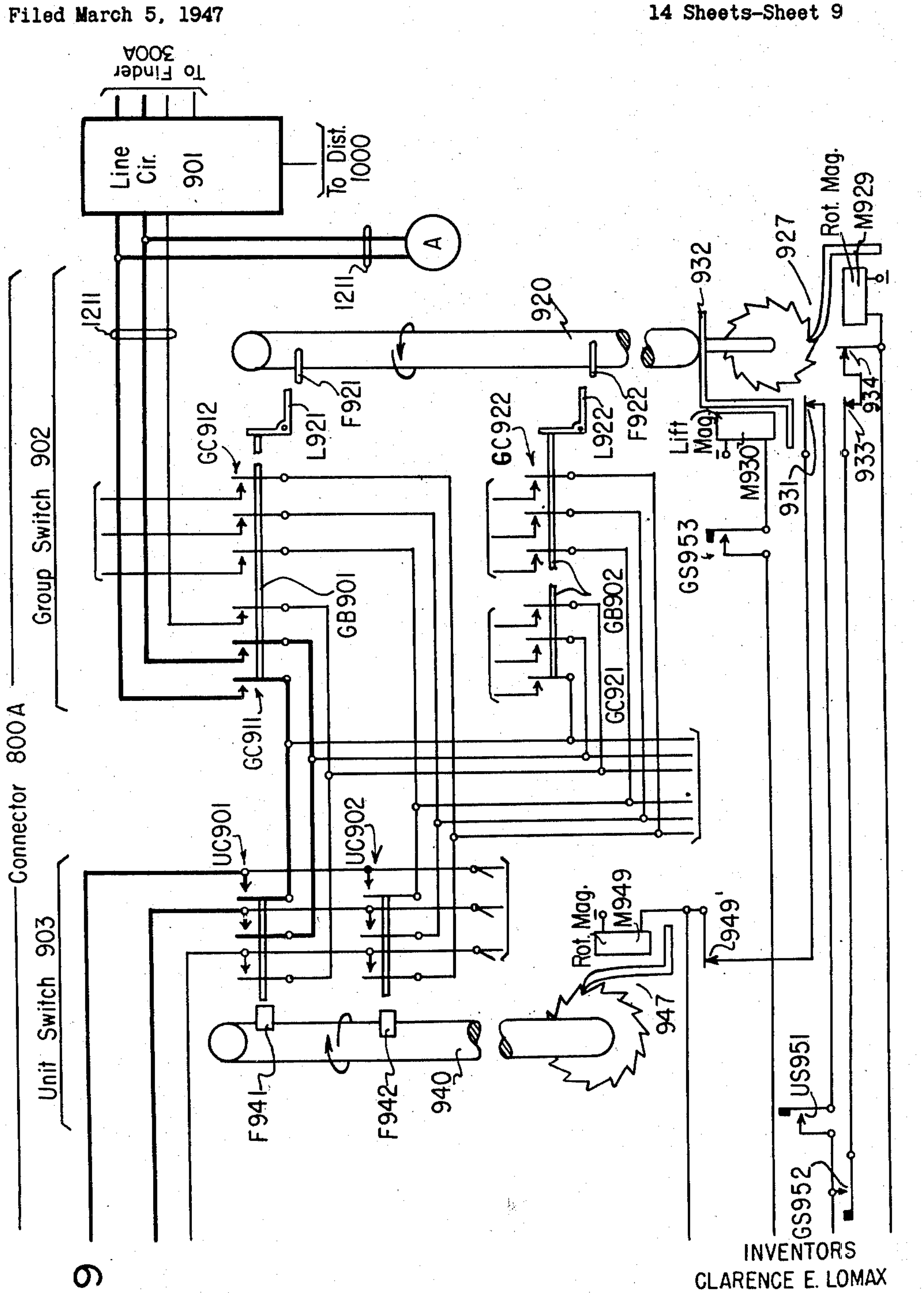

Preferably, each of the connectors is identical to the connector 800A, which comprises, as shown in Figs. 8 and 9, a group switch 902 and a unit switch 903, as well as a relay group including a line relay R810, a hold relay R820, a control relay R830, two transfer relays R840 and R850, a busy relay R860, an answer relay R870, a ring cutoff relay R880 and a switch relay R890.

The group switch 902 is of the construction and arrangement illustrated in Figs. 11, etc. and described more fully hereinafter. Specifically, the group switch 902 comprises one hundred group contact sets GC911 to GC900, inclusive, arranged in ten groups of ten group contact sets each; and ten group members or bars GB901 to GB900, inclusive, respectively associated with the ten groups of group contact sets. Also, the group switch 902 comprises an operating element 920 mounted for both rotary movement and longitudinal sliding movement and having rotary and longitudinal home positions; and carrying ten operating lugs or fingers F921 to F920, inclusive. The operating fingers F921, etc. are disposed in longitudinal and angular spaced apart relation, whereby the fingers F921, F922, etc. are disposed in a helical path about the operating element 920. The ten operating fingers F921, etc. are respectively associated with the ten group bars GB901, etc. through the intermediary of a group of pivotally mounted bell cranks L921 to L920, inclusive, respectively positioned therebetween. Further, the group switch 902 is provided with a rotary magnet M929 having an associated pawl and ratchet mechanism 927 operatively connected to the operating element 920; as well as a lift magnet M930 having an associated armature 932 operatively connected to the operating element 920.

The unit switch 903 comprises ten unit contact sets UC901 to UC900, inclusive, terminating a group of ten busses commonly associated with the ten groups of group contact sets in the group switch 902. Also, the unit switch 903 comprises an operating element 940 mounted for rotation and carrying ten operating fingers or lugs F941 to F940, inclusive. The operating fingers F941, etc., are disposed in longitudinal and angularly spaced apart relation whereby the fingers F941, etc., are disposed in a helical path about the operating element 940. The ten operating fingers F941 to F940, inclusive, are respectively associated with the ten unit contact sets UC901 to UC900, inclusive. Further, the unit switch 903 is provided with a rotary magnet M949 having an associated pawl and ratchet mechanism 947 operatively connected to the operating element 940. The operating element 940 has a home position wherein it occupies its tenth position, thereby to operate the associated tenth unit contact sets UC900.

Also, associated with the group switch 902 are the sets of switch springs GS801, GS804, GS952 and GS953 which are actuated in response to rotation of the operating element 920 in the rotary direction away from its home position. Similarly associated with the unit switch 903 are the sets of switch springs US802, US803 and US951 which are actuated in response to rotation of the operating element 940 in the rotary direction away from its home position.

Figure 10:
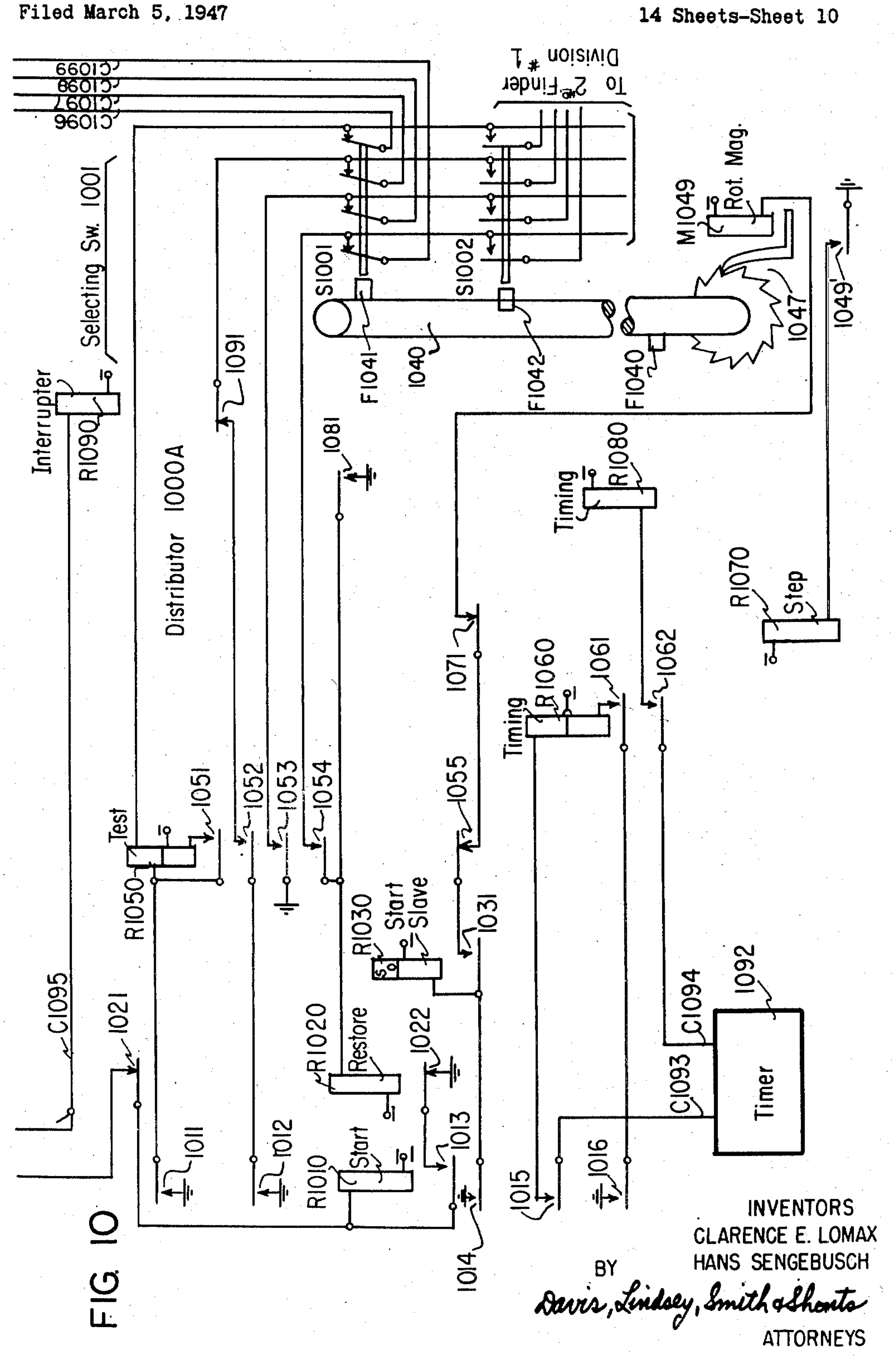

Preferably, each of the distributors is identical to the distributor 1000A, which comprises, as shown in Fig. 10, a selecting switch 1001, a timer 1092 and a relay group including a start relay R1010, a restore relay R1020, a start slave relay R1030, a test relay R1050, two timing relays R1060 and R1080, a step relay R1070 and an interrupter relay R1090. The selecting switch 1001 comprises ten contact sets S1001 to S1000, inclusive, terminating groups of control conductors respectively extending to the finders 300A, etc. in the associated group serving the twelfth 100-line group in division #1. Also, the selecting switch 1001 comprises an operating element 1040 mounted for rotation and carrying ten operating fingers or lugs F1041 to F1040, inclusive. The operating fingers F1041, etc. are disposed in longitudinal and angularly spaced apart relation; whereby the fingers F1041, etc. are disposed in a helical path about the operating element 1040. The ten operating fingers F1041 to F1040, inclusive, are respectively associated with the contact sets S1001 to S1000, inclusive. Further, the selecting switch 1001 is provided with a rotary magnet M1049 having an associated pawl and ratchet mechanism 1047 operatively connected to the operating element 1040. The operating element 1040 has no home position and is adapted to occupy any one of its ten rotary stepped positions, thereby to operate the associated one of the contact sets S1001, etc.

As previously noted, each of the finders 300A etc., first selectors 400A etc., second selectors 600A etc. and connectors 800A etc. comprises a group switch substantially identical to that shown in Fig. 11 etc. Referring now more particularly to Figs. 11 to 16, inclusive, and 19, the group switch 102 there illustrated comprises a frame 220 supporting a plurality of laterally extending and longitudinally spaced apart shelves or plates 221 and two longitudinally extending side plates 222 and 223. The uppermost shelf 221 carries a laterally extending and forwardly projecting insulating strip 224; each of the other shelves 221 carries a laterally extending and forwardly projecting insulating strip 225; and the lower wall of the frame 220 carries a laterally extending insulating block 226. A bare bus bank 227 is supported by the insulating strips 224 and 225; the bus bank 227 comprising ten individual busses, each including three individual conductor strips. Specifically, the upper ends of the conductor strips forming the bus bank 227 are imbedded in the insulating strip 224 while the longitudinally spaced apart intermediate portions of the conductor strips are supported in aligned slots formed in the insulating strips 225. The insulating block 226 carries a plurality of laterally spaced apart and forwardly projecting terminals 228 imbedded therein and engaging the lower ends of the conductor strips forming the bus bank 227 and being soldered thereto; whereby the ten busses are accessible from the rear of the frame 220 by way of the rear ends of the terminals 228.

Also, the frame 220 supports ten laterally extending group bars GB101 to GB100, inclusive, each mounted for lateral movement by an arrangement including an associated bell crank disposed adjacent to the side plate 223 and an associated link disposed adjacent to the side plate 222. For example, the first group bar GB101 is pivotally mounted adjacent the right-hand end thereof upon the associated bell crank L121 and adjacent to the left-hand end thereof upon the associated link 229. Specifically, the bell crank L121 is pivotally mounted both to the right-hand end of the first group bar GB101 and to a downwardly extending tab 230 formed integrally with the associated shelf 221 by an arrangement including a screw 231; and the link 229 is pivotally mounted both to the left-hand end of the first group bar GB101 and to a downwardly extending tab 232 formed integrally with the associated shelf 221 by an arrangement including a screw 233. More particularly, the ten group bars GB101 to GB100, inclusive, are provided with the individually associated bell cranks L121 to L120, inclusive, each mounted adjacent to the side plate 223, in the manner previously explained.

Further, the frame 220 carries ten laterally extending insulating blocks 234 supported upon the top surfaces of the shelves 221 disposed below the uppermost shelf 221. This construction is best illustrated in Figs. 14 and 15 wherein the insulating block 234 is illustrated as being supported adjacent to the rear of and upon the top surface of the shelf 221 upon which the first group bar GB101 is mounted. As illustrated, the insulating block 234 carries a plurality of laterally spaced apart and forwardly projecting switch springs 235, the extreme forward end of each switch spring 235 being bifurcated to provide two arms 236 and 237, each carrying precious metal contacts 238. The forward ends of the arms 236 and 237 carried by each switch spring 235 project into intersecting relation with respect to an associated one of the conductor strips forming the bus bank 227 and are disposed to the right of the conductor strip mentioned, as illustrated in Fig. 11. More specifically, thirty of the switch springs 235 are provided and arranged in ten sets of three respectively corresponding to the ten busses included in the bus bank 227. The intermediate portions of the switch springs 235, disposed rearwardly of the arms 236 and 237 thereof, are supported by a strip of insulation 239 carried by the associated group bar GB101; specifically, the switch springs 235 are disposed in a plurality of laterally spaced apart notches formed in the insulating strip 239. Finally, the rear ends 240 of the switch springs 235 constitute terminals accessible at the rear of the frame 220. In view of the above description it will be understood that when the first group bar GB101 is moved toward the left upon the associated bell crank L121 and link 229, that the strip of insulation 239 carried thereby forces the ten sets of switch springs 235 toward the left, whereby the contacts 238 carried by the arms 236 and 237 thereof engage the associated conductor strips in the bus bank 227. Accordingly, when the first group bar GB101 is operated the ten busses in the bus bank 227 are electrically connected to the ten sets of switch springs associated with the first group bar GB101. Considering the bus bank 227 and the ten groups of ten sets of switch springs 235 collectively, it will be appreciated that the arrangement constitutes the 100-group contact sets GC111 to GC100, inclusive; each group bar GB101 etc. being individually associated with a group of ten of the group contact sets; and each bus in the bus bank 227 being associated with an intersecting group of ten of the group contact sets. For example, the first group bar GB101 is associated with the group of ten group contact sets GC111, GC112, etc., GC119 and GC110; while the first bus in the bus bank 227 is associated with the intersecting group of ten group contact sets GC111, GC121, etc., GC191 and GC101. Accordingly, it will be understood that the ten group bars GB101, etc. are selectively operative, thereby to connect the individually associated ten sets of switch springs 235 to the ten busses in the bus bank 227.

Also, the group switch 102 comprises a longitudinally extending operating element 120 mounted upon upper and lower brackets 241 and 242, respectively, and capable of both rotary movement and longitudinal sliding movement and having rotary and longitudinal home positions. The operating element 120 carries ten operating lugs or fingers F121 to F120, inclusive, disposed in longitudinal and angular spaced relation; whereby the fingers F121 etc. are disposed in a helical path about the operating element 120. More particularly, the ten operating fingers F121 etc. are respectively associated with the ten bell cranks L121 etc. and, consequently, with the respective group bars GB101, etc. More particularly, the operating element 120 may be selectively rotated, whereby the fingers F121, F122 etc. are sequentially brought into alignment with the ends of the associated bell cranks L121, L122, etc. and then sequentially moved out of alignment with the associated bell cranks; whereby in any given rotary position of the operating element 120 a given one of the fingers F121, etc. is arranged in alignment with respect to the associated one of the bell cranks L121 etc. At this time the operating element 120 may be slid longitudinally toward the top of the frame 220, thereby to cause the finger F121 etc. to engage the associated selected bell crank L121, etc., whereby the engaged bell crank L121, etc. is rotated on its associated pivot 231 in the counterclockwise direction, as viewed in Fig. 11, thereby to move the associated group bar GB101, etc. toward the left. When the associated group bar GB101, etc. is thus operated, the ten sets of switch springs 235 individually associated therewith are operated into respective engagements with the ten busses in the bus bank 227. Subsequently, when the operating element 120 is released it is returned longitudinally toward the bottom of the frame 220 by the action of gravity, whereby the operated bell crank L121, etc. is released in order to release the associated group bar GB101, etc. The operated group bar GB101, etc. is then returned to its normal position, by virtue of the resiliency of the ten sets of switch springs 235 associated therewith, in order to open the ten group contact sets individually associated therewith.

Further, the group switch 102 comprises a rotary magnet M129 and a lift magnet M130. As best shown in Figs. 11, 12 and 16, the rotary magnet M129 comprises a heel piece 243 formed integrally with the upper bracket 241, a core 244 carrying a winding 245, and an armature 246 pivotally mounted upon the heel piece 243. A pawl and ratchet mechanism 127 operatively connects the armature 246 to the operating element 120 and comprises a ratchet wheel 247 rigidly secured to the operating element 120 adjacent to the upper end thereof, and a pawl 248 pivotally mounted on the upper end of the armature 246. The pawl 248 is normally biased toward the ratchet wheel 247 by an arrangement including a coil spring 249 extending between the pawl 248 and the armature 246. Also, the armature 246 carries a leaf spring 250, the outer end of which engages the upper bracket 241, thereby to bias the armature 246 in the counterclockwise direction, as viewed in Fig. 16, away from the operating element 120. It will be understood that each time the winding 245 is energized the core 244 attracts the armature 246, causing it to be pivoted in the clockwise direction, as viewed in Fig. 16, against the bias of the leaf spring 250 engaging the upper bracket 241; whereby the pawl 248 engaging a tooth on the ratchet wheel 247 rotates the ratchet wheel 247 one step in the clockwise direction, thereby to effect rotation of the operating element 120 one step in the clockwise direction. Subsequently, when the winding 245 is deenergized, the core 244 releases the armature 246, whereby the leaf spring 250 returns the armature 246 to its normal position causing the pawl 248 to engage the next tooth on the ratchet wheel 247, whereupon the pawl and ratchet mechanism 127 is set for the next operation. Thus it will be understood that when the magnet M129 is repeatedly operated the operating element 120 is repeatedly stepped in the clockwise direction, causing the fingers F121, etc. sequentially to select the associated bell cranks L121 etc., as previously explained.

Also, the upper bracket 241 supports a set of switch springs 251 operatively associated with an insulating button 252 carried by the armature 246, whereby the set of switch springs 251 is actuated each time the armature is operated; which arrangement may be utilized for the purpose of impulsing associated apparatus. Also, a set of off-normal switch springs 253 is associated with the operating element 120 and, as best shown in Fig. 19, is provided with an operating element in the form of a collar 254 rigidly secured to the operating element 120. More particularly the collar 254 is formed of insulating material and has a notch 255 formed therein, into which the outer end of the innermost switch spring in the set 253 rides in order to open the associated contacts when the operating element 120 is rotated to its home position. Of course it will be understood that when the operating element 120 is rotated out of its home position the outer end of the innermost switch spring in the set 253 rides out of the notch 255 formed in the collar 254, whereby the contacts carried by the set of off-normal springs 253 are actuated into engagement. The rear ends of the individual springs in the set of off-normal springs 253 are securely clamped in place between insulating strips by an arrangement including a clamping plate 256 secured to the side plate 223 by a plurality of screws 257.

Further, an arrangement is provided for centering the operating element 120 in any one of its stripped positions; which arrangement comprises, as best shown in Figs. 11 and 12, a leaf spring 258 secured to the side plate 223 by a clamping plate 259 and a plurality of screws 260. The leaf spring 258 carries a roller 261 adjacent to the outer end thereof that is pressed toward the left, as viewed in Fig. 11, into engagement with a toothed wheel 262 rigidly secured to the operating element 120. More particularly, the roller 261 rides between two of the teeth provided on the wheel 262, thereby to center the operating element 120 accurately after it has been stepped by the associated rotary magnet M129.

The lift magnet M130 comprises, as best shown in Figs. 11 and 12, a heel piece 263, supporting a core 264 carrying a winding 265, and an armature 132 pivotally mounted upon the heel piece 263. The outer end of the armature 132 is bifurcated to provide two arms 266 embracing the lower end of the operating element 120 and disposed above the lower bracket 242. The extreme outer ends of the arms 266 project upwardly and are rounded to cooperate with the lower surface of an adjacent collar 267 rigidly secured to the operating element 120. Further, the armature 132 carries a rearwardly extending arm 268 supporting an insulator 269 cooperating with a set of switch springs 270 secured to the heel piece 263 by an arrangement including a clamping plate 271 and a plurality of screws 272. When the winding 265 is energized the core 264 attracts the armature 132, whereby it is rotated in the clockwise direction, as viewed in Fig. 12, causing the arms 266 to engage the collar 267, thereby to slide longitudinally toward the top of the frame 220 the operating element 120. When the operating element 120 is thus moved longitudinally toward the top of the frame 220, the set finger F121, etc. engages the associated bell crank L121, etc. Also, when the armature 132 is thus operated the insulator 269 operates the set of switch springs 270. Subsequently, when the winding 265 is deenergized, the core 264 releases the armature 132, whereby it is returned to its home position by the action of gravity. Specifically, the armature 132 is rotated in the counterclockwise direction, as viewed in Fig. 12, back into its home position, whereupon operation thereof is arrested by a pin 273 carried by the side plate 223. Moreover, when the armature 132 is thus released the arms 266 permit the operating element 120 to be returned to its home position by the action of gravity, the operating element 120 being slid longitudinally toward the bottom of the frame 220 in order to cause the finger F121, etc. engaging the associated bell crank L121, etc. to be moved into disengagement therewith, as previously noted. Finally, when the armature 132 is thus released, the insulator 269 carried by the arm 268 permits the set of switch springs 270 to be actuated back into its normal position.

As previously explained, the group switch incorporated in each finder is operatively connected to an auxiliary switch which is employed for line group marking purposes, as explained more fully hereinafter; which auxiliary switch is constructed and arranged in the manner illustrated in Figs. 17 and 18, as previously noted. Referring to Figs. 17 and 18, the auxiliary switch S135 there illustrated is supported by the frame 220 of the group switch 102 and comprises a wiper 136, secured to a collar 137 rigidly fixed to the upper end of the operating element 120 of the group switch 102, and an insulating plate 138 secured to the uppermost shelf 221 of the group switch 102 by an arrangement including a pair of insulators 139 and a cooperating pair of screws 140. More particularly, the insulating plate 138 comprises a substantially circular body portion projecting over the upper end of the operating element 120 and having a substantially centrally disposed opening 141 formed therein and arranged in alignment with the operating element 120. A plurality of contacts 142 are annularly disposed about the body portion of the insulating plate 138 adjacent to the peripheral edge thereof and projecting therethrough and terminating in contact faces 143 disposed below the insulating plate 138. Also, a substantially semi-arcuate contact spring 144 is secured to the upper surface of the insulating plate 138 adjacent to the opening 141 formed therein and terminating in a radially directed and inwardly projecting contact arm 145. The wiper 136 carried by the collar 137 is provided with an outwardly extending arm 146 carrying a contact face 147 adapted selectively and sequentially to engage the contact faces 143 of the contacts 142 as the operating element 120 is stepped in the rotary direction. Also the wiper 136 carries an upwardly and radially directed and inwardly projecting arm 148 engaging the arm 145 carried by the contact spring 144. Thus it will be understood that the contact spring 144 may be selectively connected by the wiper 136 to the contacts 142 as the operating element 120 is stepped in the rotary direction. The arcuate configuration of the contact spring 144 and the associated inwardly projecting arm 145 accommodates longitudinal sliding movement of the operating element 120 while maintaining contact between the arm 145 carried by the contact spring 144 and the arm 148 carried by the wiper 136. Also, the length of the outwardly extending arm 146 carried by the wiper 136 accommodates longitudinal sliding movement of the operating element 120 while maintaining electrical contact with the engaged contact 142.

Considering now the connection and arrangement of the apparatus incorporated in the telephone system in greater detail, it is noted that when one or more of the finders in the group associated with the twelfth 100-line group, including the finder 300A, is idle the associated distributor 1000A is operative to allot, for the use of a calling subscriber substation in the twelfth 100-line group, an idle one of the finders mentioned. Assuming that the finder 300A is idle at this time and has been previously selected by the distributor 1000A for the use of the next calling line in the twelfth 100-line group, the distributor 1000A has previously caused operation of the selecting switch 1001, whereby the set of switch springs S1001 is operated by the associated operating finger F1041 carried by the operating element 1040 of the selecting switch 1001. More particularly, the set of switch springs S1001 is operated, thereby to connect the distributor 1000A to the control conductors C1096 to C1099, inclusive, extending to the finder 300A, as illustrated in Figs. 3 and 10.

Referring now more particularly to Figs. 3 to 10, inclusive, and assuming that a call is initiated at one of the subscriber substations, such, for example, as the subscriber substation B in the twelfth 100-line group at this time, a circuit, including the contacts 311 and 312′, is completed for operating the line relay R315 in the line circuit 301 individually associated with the subscriber line 312 extending to the calling subscriber substation B. Upon operating, the line relay R315 completes, at the contacts 315, a path for applying battery potential by way of the winding of the cutoff relay R310 to the control conductor C313 of the subscriber line 312, thereby to mark the group contact sets in the finders in the associated group terminating the subscriber line 312; and completes, at the contacts 316, a path for applying ground potential to the control conductor C314 of the subscriber line 312, thereby to mark the subscriber line 312 as busy to the connectors 800A, etc., in the associated group having access thereto. Also, the line relay R315 completes, at the contacts 318, a path for applying ground potential to the start conductor C338 extending into the distributor 1000A; and completes, at the contacts 319, a path for applying ground potential to the mark conductors C336 extending to the finders 300A, etc., in the associated group, thereby to mark to the auxiliary switches incorporated in the finders 300A, etc., the group of subscriber lines including the calling subscriber line 312. The application of ground potential to the start conductor C338 extending into the distributor 1000A completes a circuit, including the contacts 1021, for operating the start relay R1010 therein. Upon operating, the start relay R1010 completes, at the contacts 1013, a circuit, including the contacts 1022, for maintaining itself operated; and completes, at the contacts 1014, an obvious circuit for operating the start slave relay R1030, the start slave relay operating shortly thereafter it being of the slow-to-operate type. Further, the start relay R1010 completes, at the contacts 1015, a connection between the control conductor C1093 extending into the timer 1092 and the upper winding of the timing relay R1060; which connection is without effect at this time. Finally, the start relay R1010 completes, at the contacts 1011, a path for applying ground potential by way of the upper winding of the test relay R1050 and the operated set of switch springs S1001 of the selecting switch 1001 to the guard conductor C1096 extending into the finder 300A; which guard conductor C1096 has battery potential in the finder 300A connected thereto by way of the resistor 338 and the contacts 334. Accordingly, a circuit is completed for energizing the upper winding of the test relay R1050, thereby to cause the latter relay to operate and complete, at the contacts 1051, a holding circuit, including the contacts 1011, for energizing the lower winding thereof.

Also, the test relay R1050 completes, at the contacts 1053, a path including the operated set of switch springs S1001 of the selecting switch 1001 for applying ground potential to the start conductor C1098 extending into the finder 300A, thereby to complete a circuit for operating the start relay R360 therein. Upon operating, the start relay R360 completes, at the contacts 361, a connection between the winding of the lift magnet M330 of the group switch 302 and the wiper 336 of the auxiliary switch S335; which is utilized for a purpose more fully explained hereinafter. Further, the test relay R1050 completes, at the contacts 1052, a path, including the contacts 1012 and 1091 and the operated set of switch springs S1001 of the selecting switch 1001, for applying ground potential to the rotary conductor C1097 extending into the finder 300A. This application of ground potential to the rotary conductor C1097 completes a circuit, including the contacts 333, for operating the rotary magnet M329 of the group switch 302 incorporated in the finder 300A. Upon operating, the rotary magnet M329 operates the associated pawl and ratchet mechanism 327, whereby the operating element 320 is moved from its last stepped position one step in the counterclockwise direction, thereby to cause the wiper 336 of the auxiliary switch S335 associated with the operating element 320 to disengage one of the associated contacts and to engage the next one of the associated contacts. Also, upon operating, the rotary magnet M329 completes, at the contacts 337, a path for applying ground potential to the interrupter conductor C1095 extending into the distributor 1000A, thereby to complete an obvious circuit for operating the interrupter relay R1090 therein. Upon operating, the interrupter relay R1090 interrupts, at the contacts 1091, the previously mentioned path for applying ground potential to the rotary conductor C1097 extending into the finder 300A, thereby to interrupt the previously traced circuit for operating the rotary magnet M329, causing it to restore. Upon restoring, the rotary magnet M329 resets the pawl and ratchet mechanism 327, thereby to prepare the operating element 320 to be driven an additional step in the counterclockwise direction, and interrupts, at the contacts 337, the previously mentioned path for applying ground potential to the interrupter conductor C1095, whereupon the interrupter relay R1090 in the distributor 1000A restores. In view of the foregoing description it will be understood that the rotary magnet M329 of the group switch 302 in the finder 300A and the interrupter relay R1090 in the distributor 1000A effect alternate operation of each other, whereby the operating element 320 of the group switch 302 is rotated step by step in the counterclockwise direction. More particularly, the operating element 320 is rotated in the counterclockwise direction until the wiper 336 of the associated auxiliary switch S335 engages the associated contact terminating a marking conductor C336, etc., having ground potential thereon and marking to the auxiliary switch S335 the group of subscriber lines including the calling subscriber line.

Assuming that the calling subscriber line 312 is in the first group including a calling subscriber line that is tested by the auxiliary switch S335, when the wiper 336 engages the associated contact terminating the mark conductor C336 having ground potential thereon, a circuit including the contacts 361 is completed for operating the lift magnet M330 of the group switch 302. Upon operating, the lift magnet M330 interrupts, at the contacts 333, the previously traced circuit for operating the rotary magnet M329, thereby positively to prevent further operation thereof and consequent rotation of the operating element 320. Also, the lift magnet M330 interrupts, at the contacts 334, the previously traced original path for applying battery potential by way of the resistor 338 to the guard conductor C1096 extending into the distributor 1000A, whereby the absence of battery potential in the finder 300A connected to the guard conductor C1096 marks the finder 300A as busy to the selecting switch 1001 in the distributor 1000A. Also, the lift magnet M330 operates the associated armature 332, thereby to slide longitudinally the operating element 320, whereupon the operating finger F321 engages the associated bell crank L321. More particularly, when the auxiliary switch S335 was operated to engage the contact terminating the mark conductor C336, in order to effect operation of the lift magnet M330 in the manner explained above, the operating element 320 occupied a rotary position, whereby the operating finger F321 carried thereby selected the associated bell crank L321. Thus, at this time, when the bell crank L321 is operated the first group bar GB301 is operated from its normal position toward the right, thereby to operate the ten group contact sets GC311, GC312, etc. and GC310 in order to connect the ten subscriber lines in the associated group to the ten busses respectively terminated by ten unit contact sets UC301, UC302, etc. and UC300 in the unit switch 303. Specifically, the calling subscriber line 312 is connected by the group contact set GC312 to the second bus terminated by the second unit contact set UC302 in the unit switch 303. Further, the lift magnet M330 completes, at the contacts 331, a circuit including the contacts 374, 357 and 349′ for operating the rotary magnet M349 of the unit switch 303 incorporated in the finder 300A. Upon operating, the rotary magnet M349 operates the associated pawl and ratchet mechanism 347, whereby the operating element 340 is driven one step in the clockwise direction away from its last stepped position. Also, upon operating, the rotary magnet M349 interrupts, at the contacts 349′, the previously traced operating circuit therefor; whereby the rotary magnet M349 operates buzzer-fashion in order to rotate the operating element 340 step by step in the clockwise direction. More particularly, as the operating element 340 is rotated step by step in the clockwise direction, the fingers F341, etc. carried thereby sequentially operate the individually associated unit contacts sets UC301, etc. until the unit contact set UC301, etc. is operated that corresponds to the group contact set GC311, etc. in the first group that terminates a calling subscriber line. Assuming that the calling subscriber line 312 is the first calling subscriber line in the associated group, the operating element 340 is stepped until the operating finger F342 carried thereby closes the second unit contact set UC302 that is connected to the second bus, that in turn is connected to the group contact set GC312 that is operated at this time by the first group bar GB301. When the second unit contact set UC302 is thus operated a circuit is completed for energizing in series the winding of the cutoff relay R310 in the line circuit 301 and the winding of the stop relay R370 in the finder 300A. This circuit extends from ground by way of the winding of R370, the contacts 354, the operated unit contact set UC302, the operated group contact set GC312, the control conductor C313 of the calling subscriber line 312, the contacts 315 and the winding of R310 to battery. When this series circuit is completed the two relays mentioned operate.

Upon operating, the stop relay R370 interrupts, at the contacts 374, the previously traced path for operating the rotary magnet M349 of the unit switch 303, thereby positively to arrest further operation thereof; and completes, at the contacts 373, a holding circuit for maintaining operated the lift magnet M330. Also, the stop relay R370 completes, at the contacts 371 and 372, a connection between the line conductors of the calling subscriber line 312 and the upper and lower windings of the line relay R420 in the first selector 400A individually associated with the finder 300A. Upon operating, the cutoff relay R310 in the line circuit 301 completes, at the contacts 313, a holding circuit, including the grounded control conductor C313 of the subscriber line 312, for maintaining itself operated; and interrupts, at the contacts 311 and 312, the previously traced connection between the line relay R315 and the line conductors of the calling subscriber line 312, whereby the line relay R315 restores. Upon restoring, the line relay R315 interrupts, at the contacts 316, the previously mentioned original path for applying ground potential to the control conductor C314 of the calling subscriber line 312; and completes, at the contacts 317, a connection, including the contacts 313, between the control conductor C314 and the grounded control conductor C313, thereby to maintain ground potential upon the control conductor C314, for the purpose previously noted. Further, the line relay R315 interrupts, at the contacts 318, the previously mentioned path for applying ground potential to the start conductor C338 extending into the distributor 1000A; and interrupts, at the contacts 319, the previously mentioned path for applying ground potential to the mark conductor C336 extending to the auxiliary switches C335, etc. incorporated in the finders 300A, etc. in the associated group.

The above-mentioned connection between the calling subscriber line 312 and the line relay R420 in the first selector 400A extends from ground by way of the lower winding of R420 and from battery by way of the upper winding of R420 via the contacts 413 and 411, 372 and 371, the operated unit contact set UC302 and the operated group contact set GC312 to the line conductors of the calling subscriber line 312, and thence to the calling subscriber substation B. When this loop circuit is thus completed the line relay R420 in the first selector 400A operates to complete, at the contacts 421, a circuit, including the contacts 419, for operating the hold relay R430, the latter relay operating shortly thereafter, it being of the combination slow-to-operate and slow-to-release type. Upon operating, the hold relay R430 completes, at the contacts 431, an obvious circuit for operating the cut-through relay R350 in the finder 300A and a multiple circuit, including the sets of switch springs US438 and GS441, for energizing the upper winding of the transfer relay R440; whereupon the latter relay operates shortly thereafter, it being of the combination slow-to-operate and slow-to-release type. Upon operating, the cut-through relay R350 completes, at the contacts 351 and 352, points in multiple to the contacts 371 and 372 in the loop circuit extending between the calling subscriber substation B and the line relay R420 in the first selector 400A. Also, the cut-through relay R350 completes, at the contacts 353, a direct holding circuit, including the contacts 431, for maintaining operated the cutoff relay R310 in the line circuit 301. Further, the cut-through relay R350 completes, at the contacts 356, an obvious multiple holding circuit for maintaining operated the lift magnet M330 of the group switch 302; and interrupts, at the contacts 357, a further point in the previously traced circuit for operating the rotary magnet M349 of the unit switch 303. Further, the cut-through relay R350 interrupts, at the contacts 354, the previously traced circuit for operating the stop relay R370, thereby to cause the latter relay to restore. Finally, the cut-through relay R350 completes, at the contacts 355, a path for applying ground potential to the release conductor C1099 extending into the distributor 1000A. This application of ground potential to the release conductor C1099 completes a circuit, including the operated contact set S1001 of the selecting switch 1001 and the contacts 1054, for operating the restore relay R1020. Upon operating, the restore relay R1020 interrupts, at the contacts 1021, a further point in the previously traced original circuit for operating the start relay R1010, thereby to disconnect the start conductor C338 commonly associated with the group of finders, including the finder 300A, from the distributor 1000A. Also, the restore relay R1020 interrupts, at the contacts 1022, the previously traced holding circuit for maintaining operated the start relay R1010. Upon restoring, the start relay R1010, interrupts, at the contacts 1011, the previously traced holding circuit for maintaining operated the test relay R1050; and interrupts, at the contacts 1014, the previously mentioned circuit for maintaining operated the start slave relay R1030. Upon restoring, the test relay R1050 interrupts, at the contacts 1053, the previously traced circuit for operating the start relay R360 in the finder 300A in the associated group. Also, the test relay R1050 interrupts, at the contacts 1054, the previously traced circuit for operating the restore relay R1020. At this time the distributor 1000A is completely released and in readiness to allot another idle finder in the associated group, including the finder 300A, to a calling line in the twelfth 100-line group, including the subscriber line 312, extending to the subscriber substation B.

Now, assuming that there is another calling line in the twelfth 100-line group, including the subscriber line 312 extending to the subscriber substation B, ground potential is applied in the associated line circuit to the start conductor C338 extending into the distributor 1000A, thereby again to complete the circuit for operating the start relay R1010 in the distributor 1000A. Upon operating, the start relay R1010 completes, at the contacts 1014, the previously mentioned circuit for operating the start slave relay R1030, thereby to cause the latter relay to operate shortly thereafter, it being of the slow-to-operate type. Also, the start relay R1010 completes, at the contacts 1011, the previously traced path for applying ground potential by way of the upper winding of the test relay R1050 and the operated set of switch springs S1001 of the selecting switch 1001 to the guard conductor C1096 extending into the finder 300A; which guard conductor C1096 has no battery potential thereon at the present time since the lift magnet M330 in the finder 300A occupies its operated position as the finder 300A is busy. Hence, the test relay R1050 does not operate at this time; and, upon operating, the start slave relay R1030 completes, at the contacts 1031, a circuit, including the contacts 1014, 1055 and 1071, for operating the rotary magnet M1049 of the selecting switch 1001. Upon operating, the rotary magnet M1049 drives through the associated pawl and ratchet mechanism 1047 the operating element 1040 of the selecting switch 1001 one step in the counterclockwise direction, thereby to cause the first operating finger F1041 to open the associated first set of switch springs S1001 and to cause the second operating finger F1042 to close the associated second set of switch springs S1002. Accordingly, the operating element 1040 is controlled to actuate the first set of switch springs S1001 in order to disconnect from the distributor 1000A the control conductors C1096, etc. extending to the first finder 300A in the associated group and to actuate the second set of switch springs S1002 in order to connect to the distributor 1000A the control conductors extending to the second finder in the associated group. Also, upon operating, the rotary magnet M1049 completes, at the contacts 1049', a circuit for operating the step relay R1070. Upon operating, the step relay R1070 interrupts, at the contacts 1071, the previously traced circuit for operating the rotary magnet M1049, whereby the rotary magnet M1049 restores in order to reset the associated pawl and ratchet mechanism 1047 thereby to condition the operating element 1040 of the selecting switch 1001 to be driven an additional step in the counterclockwise direction.

When the control conductors extending to the second finder in the associated group are connected to the distributor 1000A incident to operation of the second set of switch springs S1002 of the selecting switch 1001, ground potential, at the contacts 1011, is connected by way of the upper winding of the test relay R1050 and the operated second set of switch springs S1002 to the guard conductor extending to the second finder in the associated group. Accordingly, in the event no potential appears upon the guard conductor extending to the second finder in the associated group, the test relay R1050 is not operated; on the other hand, in the event battery potential appears upon the guard conductor extending to the second finder in the associated group, a circuit substantially identical to that previously traced is completed for energizing the upper winding of the test relay R1050 in order to cause the test relay R1050 to operate. Accordingly, the rotary magnet M1049 of the selecting switch 1001 cooperates with the step relay R1070 in the manner described above, whereby the operating element 1040 of the selecting switch 1001 is driven step by step in the counter-clockwise direction until the operating element 1040 operates a set of switch springs S1001, etc. terminating a group of control conductors extending to an idle finder in the associated group, whereupon the test relay R1050 operates in order to arrest further operation of the rotary magnet M1049.

Assuming that the selecting switch 1001 has operated to connect an idle finder in the associated group to the distributor 1000A, the test relay R1050 operates, as previously explained, to interrupt, at the contacts 1055, the previously traced circuit for operating the rotary magnet M1049 thereby positively to prevent further operation thereof. Further, the test relay R1050 completes, at the contacts 1051, the previously traced holding circuit for energizing the lower winding thereof. Also, the test relay R1050 completes, at the contacts 1052 and 1053, the previously traced paths for applying gground potential to the rotary and the start conductors extending to the selected idle finder in the associated group; and prepares, at the contacts 1054, an alternative circuit substantially identical to that previously traced for operating the restore relay R1020. The distributor 1000A then controls operation of the selected finder in the associated group to hunt for and find the other calling subscriber line in the twelfth 100-line group, including the subscriber line 312, all in the manner previously explained.

In the foregoing description of the operation of the distributor 1000A to control operation of the selected finder 300A in the associated group to find the calling subscriber line 312 extending to the subscriber substation B, it was assumed that the selected idle finder 300A operated to find the calling subscriber line 312 promptly and without unreasonable delay. However, through mechanical or electrical faults, it might occur that the finder 300A does not operate promptly to find the calling subscriber line 312, and in this peculiar case the timer 1092 in the distributor 1000A is operated through a cycle in order to release the faulty selected idle finder and to assign another idle finder in the associated group. Specifically, when the start relay R1010 in the distributor 1000A operated it completed, at the contacts 1015, a connection between the upper winding of the timing relay R1060 and the control conductor C1093 extending into the timer 1092. Thereafter the timer 1092 operates to cause ground potential to be applied to the control conductor C1093 in order to complete an obvious circuit for energizing the upper winding of the timing relay R1060, causing the latter relay to operate and complete, at the contacts 1061, a holding circuit, including the contacts 1016, for energizing the lower winding thereof. Also, the timing relay R1060 completes, at the contacts 1062, an obvious connection between the winding of the timing relay R1080 and the control conductor C1094 extending into the timer 1092. The timer 1092 is arranged to cause ground potential to be applied first to the control conductor C1093 and thereafter to the control conductor C1094; whereby, a measured time interval after operation of the timing relay R1060, an obvious circuit is completed for operating the timing relay R1080. Thus, the timing relay R1080 operates a measured time interval after operation of the timing relay R1060; which time interval is considerable and during which the finder 300A allotted by the distributor 1000A at the present time has ample time to find the calling subscriber line 312, all in the manner previously explained. Continuing with the peculiar circumstance that the finder 300A fails to find the calling subscriber line 312 during the measured time interval mentioned, upon operating, the timing relay R1080 completes, at the contacts 1081, an obvious alternative circuit for operating the restore relay R1020. Upon operating, the restore relay R1020 effects the restoration of the start relay R1010; that, in turn, effects the restoration of the test relay R1050 and the start slave relay R1030, all in the manner previously explained. Also, upon restoring, the start relay R1010 interrupts, at the contacts 1016, the holding circuit for energizing the lower winding of the timing relay R1060, thereby to cause the latter relay to restore and interrupt, at the contacts 1062, the previously traced circuit for operating the timing relay R1080. Upon restoring, the timing relay R1080 interrupts, at the contacts 1081, the previously mentioned alternative circuit for operating the restore relay R1020. Upon restoring, the restore relay R1020 again completes, at the contacts 1021, the previously traced connection between the start relay R1010 and the start conductor C338, whereby the start relay R1010 is reoperated in order to effect reoperation of the start slave relay R1030 in the manner previously explained. Upon reoperating, the start slave relay R1030 effects reoperation of the rotary magnet M1049 in the selecting switch 1001; whereby the rotary magnet M1049 cooperates with the step relay R1070, in the manner previously explained, to select a group of control conductors extending to an idle finder in the associated group; whereupon the test relay R1050 operates in order that the distributor 1000A may control the selected idle finder in the associated group, all in the manner previously explained.

Continuing now with the extension of the connection from the calling subscriber substation B in the twelfth 100-line group, the finder 300A has found the calling subscriber line 312; and, in the associated first selector 400A, the line relay R420, the hold relay R430 and the transfer relay R440 have operated, all in the manner previously explained. At this time the first selector 400A is in readiness to receive the first digit dialed at the calling subscriber substation B; and assuming that the call is to be extended, for example, to the called subscriber substation A, the subscriber at the calling subscriber substation B proceeds to dial the first digit of the directory number of the called subscriber substation A; the directory number of which is 1211. When the subscriber at the calling subscriber substation B dials the first digit 1 thereat, the single impulse of this digit is transmitted over the calling subscriber line 312 and the associated loop circuit, including the finder 300A, to the line relay R420 in the first selector 400A, thereby to cause the latter relay to restore and then reoperate in accordance with the single impulse of the first digit 1. Upon restoring and then reoperating, the line relay R420 interrupts and then recompletes, at the contacts 421, the previously traced circuit for energizing the winding of the hold relay R430; however, the latter relay does not restore during impulsing as it is of the combination slow-to-operate and slow-to-release type. Also, upon restoring and then upon reoperating, the line relay R420 completes and then interrupts, at the contacts 422, a circuit, including the contacts 419, 435 and 443, for energizing the lower winding of the transfer relay R440, thereby to maintain the latter relay in its operated position during impulsing, since it is of the combination slow-to-operate and slow-to-release type. Also, upon restoring and then upon reoperating, the line relay R420 completes and then interrupts, at the contacts 422, a multiple circuit, including the contacts 419, 435 and 444, for energizing the rotary magnet M529 of the group switch 502 incorporated in the first selector 400A, whereby the rotary magnet M529 operates and then restores.

When the rotary magnet M529 operates it drives through the associated pawl and ratchet mechanism 527 the operating element 520 of the group switch 502 one step in the clockwise direction away from its home position, whereupon the first operating finger F521 carried by the operating element 520 is brought into alignment with the associated first bell crank L521; that, in turn, is associated with the first group bar GB501. Also, when the operating element 520 is driven one step in the clockwise direction away from its home position, the sets of switch springs GS441, GS454 and GS536 are actuated for a purpose more fully explained hereinafter. When the rotary magnet M529 then restores it resets the associated pawl and ratchet mechanism 527 in readiness to drive the operating element 520 an additional step in the clockwise direction. More particularly, the set of switch springs GS441 is actuated into disengagement, thereby to interrupt the previously traced circuit for energizing the upper winding of the transfer relay R440 and to interrupt a further point in the previously traced original path for applying battery potential by way of the upper winding of the transfer relay D440 to the associated control conductor extending to the finder 300A.

At the conclusion of the first digit 1 the line relay R420 is maintained in its operated position thereby to maintain interrupted, at the contacts 422, the previously traced multiple circuits for energizing the lower winding of the transfer relay R440 and for operating the rotary magnet M529 of the group switch 502, thereby positively to prevent further operation of the group switch 502 and to permit the transfer relay R440 to restore shortly thereafter, it being of the combination slow-to-operate and slow-to-release type, as previously noted. Upon restoring, the transfer relay R440 interrupts, at the contacts 443, a further point in the previously traced circuit for energizing the lower winding thereof; and interrupts, at the contacts 444, a further point in the previously traced circuit for operating the rotary magnet M529. Also, the transfer relay R440 completes, at the contacts 442, a circuit including the contacts 433 and the set of switch springs GS454 for operating the lift magnet M530 of the group switch 502. More particularly, the lift magnet M530 operates the associated armature 532 whereby the operating element 520 is slid longitudinally, causing the first operating finger F521 to rotate the previously selected first bell crank L521 in the counterclockwise direction, whereby the associated first group bar GB501 is moved toward the left, thereby to close the ten group contacts GC511 to GC510, inclusive, in the associated group.

Also, the lift magnet M520 completes, at the contacts 531, a path for applying ground potential by way of the winding of the test relay R450 to the first trunk T511 in the previously selected group. This operation is brought about by virtue of the fact that the operating element 540 of the unit switch 503 occupies its home position closing the first unit contact set UC501, whereby the first trunk T511 in the selected group is connected via the operated group contact set GC511 and the operated first unit contact set UC501 to the test relay R450. At this time ground potential appears upon the control conductor of the trunk T511 in the event the associated second selector 600A is busy; and battery potential appears upon the control conductor of the trunk T511 in the event the associated second selector 600A is idle. The above-mentioned circuit for applying ground potential by way of the winding of the test relay R450 in the first selector 400A to the control conductor of the trunk T511 extends from ground by way of the contacts 531, 462 and 434, the winding of R450, the contacts of the operated first unit contact set UC501, the control conductor of the associated first bus, and the contacts of the operated group contact set GC511 to the control conductor of the trunk T511. Accordingly, at this time the winding of the test relay R450 is short-circuited in the event ground potential in the second selector 600A is applied to the control conductor of the trunk T511; on the other hand, the winding of the test relay R450 is energized in the event battery potential in the second selector 600A is applied to the control conductor of the trunk T511.

First, assuming that the trunk T511 and, consequently, the second selector 600A is idle, battery potential is applied to the control conductor of the trunk T511 by way of the upper winding of the transfer relay R640 and the set of switch springs GS641 in the second selector 600A; whereby the winding of the test relay R450 is energized and the latter relay operates immediately. At the conclusion of the stroke of the lift magnet M530 of the group switch 502 in the first selector 400A a circuit is prepared, at the contacts 534, for operating the rotary magnet M549 of the unit switch 503 in the first selector 400A; which circuit, when completed, extends from ground by way of the contacts 432, 451, 416, 463, 534 and 549', and the rotary magnet M549 to battery. However, the above-traced circuit is not completed in the present example since, upon operating, the test relay R450 interrupts this circuit at the contacts 451; which test relay R450 operates before the lift magnet M530 of the group switch 502 completes its stroke. Also, upon operating, the test relay R450 completes, at the contacts 452, a circuit, including the contacts 432, for operating the switch relay R410. Upon operating, the switch relay R410 interrupts, at the contacts 411 and 413, the previously traced loop circuit extending from the calling subscriber substation B to the line relay R420 in the first selector 400A; and completes, at the contacts 412 and 414, an alternative loop circuit extending from the calling subscriber substation B to the line relay R620 in the second selector 600A. The above-traced loop circuit extends from battery and ground patentials by way of the upper and lower windings of R620 in the second selector 600A, the contacts 611 and 613, the line conductors of the trunk T511, the operating group contact set GC511, the associated first bus, the operated unit contact set UC501, and the contacts 412 and 414 into the finder 300A; and thence by way of the previously traced circuit to the calling subscriber substation B. When the above-traced loop circuit is completed between the calling subscriber substation B and the upper and lower windings of the line relay R620 in the second selector 600A, the latter relay operates to complete, at the contacts 621, a circuit, including the contacts 619, for operating the hold relay R630; whereby the latter relay operates shortly thereafter it being of the combination slow-to-operate and slow-to-release type. Upon operating, the hold relay R630 completes, at the contacts 631, an obvious direct path for applying ground potential to the control conductor of the trunk T511, thereby to maintain operated the first selector 400A and the finder 300A, as well as the cutoff relay R310 in the line circuit 301 individually associated with the calling subscriber line 312.

Also, upon operating, the switch relay R410 in the first selector 400A completes, at the contacts 415, a holding circuit therefor including the grounded control conductor of the trunk T511; which holding circuit also includes the operated group contact set GC511, the control conductor of the associated bus, the operated unit contact set UC501, and the contacts 417; whereby the switch relay R410 in the first selector 400A is maintained operated in multiple with the cut-through relay R350 in the finder 300A. The operated cut-through relay R350 in the finder 300A maintains the finder 300A in its operated position and maintains the cutoff relay R310 in the line circuit 301 in its operated position. The switch relay R410 in the first selector 400A maintains the first selector 400A in its operated position. Also, incident to operation of the switch relay R410, there is interrupted, at the contacts 416, a further point in the previously traced circuit for operating the rotary magnet M549 of the unit switch 503 in the first selector 400A. Also, the switch relay R410, upon operating, completes, at the contacts 418, an alternative holding circuit, including the contacts 442 and the set of switch springs GS454, for maintaining operated the lift magnet M530 of the group switch 502 in the first selector 400A. Further, the switch relay R410 interrupts, at the contacts 419, the previously traced circuit for maintaining operated the hold relay R430, thereby to cause the latter relay to restore shortly thereafter it being of the combination slow-to-operate and slow-to-release type. At this point it is noted that, when the previously traced circuit for energizing the winding of the test relay R450 in the first selector 400A in series with the upper winding of the transfer relay R640 in the second selector 600A was completed, the test relay R450 operated immediately, as previously explained, whereas the transfer relay R640 operated shortly thereafter since it is of the combination slow-to-operate and slow-to-release type. Upon restoring, the hold relay R430 interrupts, at the contacts 434, the previously traced original circuit for energizing the winding of the test relay R450, thereby to cause the latter relay to restore. At this time the connection has been extended from the calling subscriber substation B via the finder 300A and the first selector 400A to the second selector 600A; and the second selector 600A is in readiness to receive the second digit 2 when it is dialed at the calling subscriber substation B.

In the foregoing description it was assumed that the first trunk T511 in the associated group selected by the group switch 502 is idle at this time, whereby no operation of the unit switch 503 in the first selector 400A was required. However, as previously indicated, it may occur that the first trunk T511 in the group selected by the group switch 502 in the first selector 400A is busy at this time, whereby ground potential appearing upon the control conductor thereof short-circuits the winding of the test relay R450 in the first selector 400A, as previously noted. In this case, when the lift magnet M530 of the group switch 502 completes its stroke it closes the contacts 534 thereby to complete the previously traced circuit for operating the rotary magnet M549 of the unit switch 503 in the first selector 400A. In this case the rotary magnet M549 operates to drive through the associated pawl and ratchet mechanism 547 the operating element 540 of the unit switch 503 one step in the counterclockwise direction away from its home position, whereby the first operating finger F541 actuates the first unit contact set UC501 into open circuit position and the second finger F542 operates the second unit contact set UC502 into closed circuit position. Accordingly, the first trunk T511 in the previously selected group is disconnected from the test relay R450 and the second trunk in the previously selected group is connected to the test relay R450. Hence, the second trunk in the previously selected group is tested and in the event it is idle the test relay R450 is operated, all in the manner previously explained. On the other hand, in the event the second trunk in the previously selected group is also busy, the winding of the test relay R450 is again short-circuited whereby the rotary magnet M549 is reoperated in order to bring about the disconnection of the second trunk and the connection of the third trunk in the previously selected group to the test relay R450. Each time the rotary magnet M549 operates it not only drives through the associated pawl and ratchet mechanism 547 the operating element 540 of the unit switch 503 one step in the counterclockwise direction but it also interrupts, at the contacts 549′, the operating circuit therefor whereby the rotary magnet M549 operates buzzer-fashion until an idle trunk in the previously selected group is connected to the test relay R450, causing the latter relay to operate and interrupt, at the contacts 451, the previously traced circuit for operating the rotary magnet M549.

As previously explained, there are nine trunks in the previously selected group, including the trunk T511, and in the event all nine of these trunks are busy the unit switch 503 is operated in order to cause the tenth unit contact set UC500 to be actuated into closed circuit position, whereby the trunk T510 extending to the second selector 600C is tested. Of course, in the event the second selector 600C is idle the trunk T510 is tested as being idle by the test relay R450 in the first selector 400A, and the first selector 400A is switched through to extend the loop circuit from the calling subscriber substation B to the second selector 600C in a manner substantially identical to that previously explained. However, in the event the second selector 600C is also busy at this time the trunk T510 extending thereto is tested by the test relay R450 in the first selector 400A as being busy, whereby the rotary magnet M549 of the unit switch 503 is again operated thereby to drive the operating element 540 an additional step in the counterclockwise direction into its eleventh position. At this point it is noted that, when the operating element 540 of the unit switch 503 is driven away from its home position one step in the counterclockwise direction, the sets of switch springs US438 and US550 are actuated for a purpose more fully explained hereinafter. At this time, when the operating element 540 of the unit switch 503 is driven eleven steps away from its home position, the eleventh operating finger F540′ carried thereby actuates the set of switch springs US511 into circuit closed position, thereby to complete a circuit, including the contacts 437, for operating the busy relay R460. Upon operating, the busy relay R460 interrupts, at the contacts 463, the previously traced circuit for operating the rotary magnet M549, thereby positively to prevent further operation thereof. Also, the busy relay R460 interrupts, at the contacts 462, a further point in the previously traced test circuit including the winding of the test relay R450; and completes, at the contacts 461, a path including the condenser 453 for connecting the busy conductor C464 to one of the line conductors extending between the finder 300A and the first selector 400A, whereby busy tone current is returned over the previously traced loop circuit to the calling subscriber substation B in order to indicate to the subscriber thereat that the present connection cannot be completed by virtue of the all-trunks-busy condition encountered. In this case the subscriber at the calling subscriber substation B replaces the receiver of the telephone instrument thereat upon its associated switchhook thereby to effect the release of the first selector 400A and the finder 300A, all in a manner substantially identical to that described hereinafter.

Again assuming that the first selector 400A tested the first trunk T511 in the previously selected group as idle and that the first selector 400A operated in the manner previously explained, to switch through in order to cause the previously traced loop circuit to be completed between the calling subscriber substation B and the line relay R620 in the second selector 600A, the line relay R620, the hold relay R630 and the transfer relay R640 in the second selector 600A operate, whereby the second selector 600A is rendered responsive to the second digit to be dialed at the calling subscriber substation B. The subscriber at the calling subscriber substation B then proceeds to dial the second digit 2, whereby the line relay R620 in the second selector 600A follows the impulses of the second digit 2. Each time the relay R620 restores and then reoperates it interrupts and then recompletes, at the contacts 621, the previously traced circuit for maintaining operated the hold relay R630 whereby the latter relay remains operated during impulsing as it is of the combination slow-to-operate and slow-to-release type. Also, each time the line relay R620 restores and then reoperates it completes and then interrupts, at the contacts 622, a circuit including the contacts 619, 635 and 643 for energizing the lower winding of the transfer relay R640, thereby to retain the latter relay in its operated position during impulsing since it is of the combination slow-to-operate and slow-to-release type. Finally, each time the line relay R620 restores and then reoperates it completes and then interrupts, at the contacts 622, a multiple circuit including the contacts 619, 635 and 644 for operating the rotary magnet M729 of the group switch 702 incorporated in the second selector 600A, whereby the rotary magnet M729 is operated a number of times corresponding to the number of impulses in the second digit 2.

Each time the rotary magnet M729 operates it drives through the associated pawl and ratchet mechanism 727 the operating element 720 of the group switch 702 one step in the clockwise direction away from its home position; and each time the rotary magnet M729 restores it resets the associated pawl and ratchet mechanism 727 in order to condition the operating element 720 to be driven an additional step in the clockwise direction away from its home position. When the operating element 720 is driven one step in the clockwise direction away from its home position the sets of switch springs GS641, GS654 and GS736 are actuated for a purpose more fully explained hereinafter. At the conclusion of the second digit 2 the line relay R620 is retained in its operated position; and, shortly thereafter, the transfer relay R640 restores since it is of the combination slow-to-operate and slow-to-release type. The transfer relay R640 restores since the previously traced circuit for energizing the upper winding thereof is interrupted incident to actuation of the set of switch springs GS641, and the previously traced circuit for energizing the lower winding of the transfer relay R640 in multiple with the rotary magnet M729 of the group switch 702 is interrupted, at the contacts 622, incident to the line relay R620 being maintained in its operated position.

Also, at the conclusion of the second digit 2 the second operating finger F722 carried by the operating element 720 is arranged in alignment with the associated second bell crank L722 individual to the second group bar GB702, whereby the second ten line group of trunks, including the trunk T721, is selected by the group switch 702. Upon restoring, the transfer relay R640 interrupts, at the contacts 643, a further point in the previously traced circuit for energizing the lower winding thereof; and interrupts, at the contacts 644, a further point in the previously traced circuit for operating the rotary magnet M729 of the group switch 702. Further, the transfer relay R640 completes, at the contacts 642, a circuit, including the contacts 633 and the set of switch springs GS654, for operating the lift magnet M730 of the group switch 702. Upon operating, the lift magnet M730 attracts its associated armature 732, whereby the operating element 720 is slid longitudinally in order to cause the operating finger F722 to operate the associated bell crank L722, causing the second group bar GB702 to be moved toward the left. When the second group bar GB702 is thus operated the second group of ten group contact sets GC721 to GC720, inclusive, are closed, thereby to connect the individual trunks in the previously selected ten line group to the respective busses extending to the unit switch 703 incorporated in the second selector 600A.

As previously noted, the operating element 740 of the unit switch 703 has no home position and occupies its last operated position, whereby one of the ten unit contact sets UC701 to UC700, inclusive, is actuated to its closed circuit position. In the present example, it may be assumed that the second unit contact set UC702 is actuated to its closed circuit position thereby to connect to the test relay R650 the associated second bus, and, consequently, the second trunk in the previously selected group of ten. Also, upon operating, the lift magnet M730 completes a path, including the contacts 731, 662 and 634, for applying ground potential by way of the winding of the test relay R650 to the unit switch 703 and, consequently, by way of the operated unit contact set UC701, etc., the associated bus, and the associated operated group contact set GC721, etc., to the selected trunk in the previously selected group. In the event the trunk mentioned is busy, ground potential appears upon the control conductor thereof completing a path, including the contacts mentioned, for short-circuiting the winding of the test relay R650. On the other hand, in the event the trunk mentioned is idle, battery potential appearing upon the control conductor thereof completes a circuit substantially identical to that previously traced for energizing the winding of the test relay R650, thereby to cause the latter relay to operate. Finally, upon operating, the lift magnet M730 prepares at the end of its stroke, at the contacts 734, a path, including the contacts 632, 651, 616, 663 and 749', for operating the rotary magnet M749; which circuit is completed only in the event the test relay R650 fails to operate as a consequence of the selected trunk in the previously selected group being busy at this time. Assuming that the second trunk in the previously selected second group that is operatively connected to the test relay R650 in the present example is busy at this time, the winding of the test relay R650 is short-circuited, as previously explained, whereby the latter relay does not operate and the previously traced circuit for operating the rotary magnet M749 of the unit switch 703 is completed. Upon operating, the rotary magnet M749 drives through the associated pawl and ratchet mechanism 747 the operating element 740 of the unit switch 703 one step in the counterclockwise direction away from its last stepped position since the operating element 740 has no home position, as previously explained. When the operating element 740 is driven an additional step in the counterclockwise direction the operating finger F742 causes the second unit contact set UC702 to be restored to its normal position, disconnecting the associated second bus from the test relay R650. Also, at this time the third operating finger F743 closes the third unit contact set UC703, thereby to connect the associated third bus and, consequently, the third trunk in the previously selected group to the test relay R650, whereby the idle or busy condition of the trunk mentioned is tested. Also, upon operating, the rotary magnet M749 interrupts, at the contacts 749', the previously traced circuit for operating it, whereby it restores in order to reset the associated pawl and ratchet mechanism 747, conditioning the operating element 740 to be driven an additional step in the counterclockwise direction. Further, upon restoring, the rotary magnet M749 recompletes, at its contacts 749', the previously traced operating circuit therefor in the event the test relay R650 has not operated at this time. Accordingly, the rotary magnet M749 operates buzzer-fashion in order to cause the operating element 740 to be driven step by step in the counterclockwise direction, causing the test relay R650 to test sequentially the trunks in the previously selected group, including the trunk T721 extending to the connector 800A in the associated group.

First assuming that each trunk preceding the first trunk T721 in the previously selected group is busy at this time, operation of the rotary magnet M749 continues until the first operating finger F741 operates the first unit contact set UC701 into closed circuit position, in order to cause the test relay R650 to test the first trunk T721 in the previously selected group. Now assuming that the first trunk T721 in the previously selected group is idle at this time, the previously traced circuit for operating the test relay R650 is completed, whereby the latter relay operates to interrupt, at the contacts 651, the previously traced circuit for operating the rotary magnet M749 thereby positively to prevent further operation of the unit switch 703. Also, the test relay R650 completes, at the contacts 652, a circuit, including the contacts 632, for operating the switch relay R610. Upon operating, the switch relay R610 interrupts, at the contacts 611 and 613, the previously traced loop circuit extending between the calling subscriber substation B and the line relay R620 in the second selector 600A, and completes, at the contacts 612 and 614, an alternative loop circuit extending between the calling subscriber substation B and the line relay R810 in the connector 800A. The above-mentioned loop circuit extends from battery and ground potentials by way of the upper and lower windings of the line relay R810 in the connector 800A, the line conductors of the trunk T721, the operated second group contact set GC702, the associated first bus, the operated first unit contact set UC701, and the contacts 612 and 614 to the line conductors of the trunk T511; which loop circuit extends back through the first selector 400A, the finder 300A and the line conductors of the subscriber line 312 to the calling subscriber substation B, all as previously traced. When the loop circuit above traced is completed the line relay R810 in the connector 800A operates, for a purpose more fully explained hereinafter. Also, upon operating, the switch relay R610 completes, at the contacts 615, a holding circuit therefor including the grounded control conductor of the trunk T511, and interrupts, at the contacts 616, a further point in the previously traced circuit for operating the rotary magnet M749 of the unit switch 703 incorporated in the second selector 600A. Further, the switch relay R610 completes, at the contacts 617, a connection between the control conductor of the trunk T511 and the control conductor of the trunk T721, which connection includes the operated first unit contact set UC701, the control conductor of the associated first bus, and the operated second group contact set GC721. At this time ground potential in the connector 800A is applied to the control conductor of the trunk T721, thereby to maintain operated the switch relay R610 in the second selector 600A and to maintain operated the first selector 400A, the finder 300A, and the cutoff relay R310 in the line circuit 301 individual to the calling subscriber line 312, all in the manner previously explained. Finally, the switch relay R610 completes, at the contacts 618, an alternative holding circuit, including the contacts 642 and the set of switch springs GS654, for maintaining operated the lift magnet M730 of the group switch 702 incorporated in the second selector 600A; and interrupts, at the contacts 619, the previously traced circuit for maintaining operated the hold relay R630, thereby to cause the latter relay to restore shortly thereafter it being of the combination slow-to-operate and slow-to-release type, as previously noted. Upon restoring, the hold relay R630 interrupts, at the contacts 631, the previously traced original path for applying ground potential in the second selector 600A to the control conductor of the trunk T511; and interrupts, at the contacts 634, the previously traced circuit for operating the test relay R650 in order to cause the latter relay to restore.

Upon operating, the line relay R810 in the connector 800A completes, at the contacts 811, a circuit for operating the hold relay R820, thereby to cause the latter relay to operate shortly thereafter it being of the combination slow-to-operate and slow-to-release type. Upon operating, the hold relay R820 completes, at the contacts 821, the previously mentioned path for applying ground potential in the connector 800A to the control conductor of the trunk T721, thereby to maintain operated the second selector 600A and the remainder of the preceding switch train, as previously explained. Further, the hold relay R820 completes, at the contacts 821, a circuit, including the contacts 831 and the set of switch springs GS804, for energizing the lower winding of the transfer relay R840, thereby to cause the latter relay to operate shortly thereafter it being of the combination slow-to-operate and slow-to-release type. At this time the second selector 600A has operated to seize the trunk T721 extending to the connector 800A, and the connector 800A has been conditioned to be responsive to the third digit 1 to be dialed at the calling subscriber substation B.

Reconsidering the operation of the second selector 600A, and assuming that all of the trunks in the previously selected group, including the trunk T721, are busy when operation of the unit switch 703 incorporated in the second selector 600A is initiated, in the manner explained above, when the operating element 740 of the unit switch 703 is operated to close the first unit contact set UC701 in its cycle of operation the set of switch springs US701 associated with the first unit contact set UC701 is closed in order to complete an obvious circuit for operating the control relay R670. Upon operating, the control relay R670 completes, at the contacts 673, a holding circuit therefor including the contacts 639. Also, upon operating, the control relay R670 prepares, at the contacts 672, a circuit, traced hereinafter, for operating the busy relay R660. The rotary magnet M749 continues to operate, whereby the first unit contact set UC701 is operated to its open circuit position and the second unit contact set UC702 is again operated to its closed circuit position, whereby the second trunk in the previously selected group is again tested. This operation continues until the tenth unit contact set UC700 is again operated to its closed circuit position in order to cause the tenth trunk in the previously selected group to be tested again. In the event the tenth trunk in the previously selected group is again tested as being busy, the test relay R650 again fails to operate, as previously explained. However, at this time when the tenth unit contact set UC700 is operated into its closed circuit position, the associated set of switch springs US710 is operated to its closed circuit position, thereby to complete the previously mentioned circuit, including the contacts 672 and 637, for operating the busy relay R660. Accordingly, the busy relay R660 is operated only after the unit switch 703 is operated from its last stepped position through its first position and thence through its tenth position, whereby the trunks in the previously selected group are individually tested at least once, and many of them twice, before the busy relay R660 is operated.

Upon operating, the busy relay R660 interrupts, at the contacts 663, the previously traced circuit for operating the rotary magnet M749, thereby positively to prevent further operation of the unit switch 703; and interrupts, at the contacts 662, the previously traced circuit for the test relay R650 in order to prevent further testing by the relay mentioned. Finally, the busy relay R660 completes, at the contacts 661, a path, including the busy conductor C664, the contacts 671, the condenser 653 and the contacts 611, for connecting busy tone current to one of the line conductors of the trunk T511, whereby busy tone current is returned over the previously traced loop circuit to the calling subscriber substation B in order to indicate to the subscriber thereat that the present connection cannot be completed at this time due to the all-trunks busy condition encountered by the switching apparatus. The subscriber at the calling subscriber substation B then replaces the receiver of the telephone instrument thereat upon its associated switchhook in order to effect the release of the second selector 600A and the preceding elements of the switch train, in a manner substantially identical to that explained hereinafter.

Again assuming that the second selector 600A operates to seize the trunk T721 extending to the connector 800A, the connector 800A is conditioned to be responsive to the third digit 1 to be dialed at the calling subscriber substation B, as previously explained. When the subscriber at the calling subscriber substation B dials the third digit 1, the line relay R810 restores and then reoperates following the single impulse of the third digit 1. Upon restoring and then upon reoperating the line relay R810 interrupts and then recompletes, at the contacts 811, the previously mentioned circuit for maintaining operated the hold relay R820, whereby the latter relay is maintained operated during impulsing since it is of the combination slow-to-operate and slow-to-release type. Also, upon restoring and then upon reoperating the line relay R810 completes and then interrupts, at the contacts 812, a circuit including the contacts 823 and 843 for energizing the upper winding of the transfer relay R840, thereby to maintain the latter relay in its operated position during impulsing since it is of the combination slow-to-operate and slow-to-release type. Further, upon restoring and then upon reoperating, the line relay R810 completes and then interrupts, at the contacts 812, a multiple circuit, including the contacts 823 and 841, for operating the rotary magnet M929 of the group switch 902. Upon operating, the rotary magnet M929 drives through the associated pawl and ratchet mechanism 927 the operating element 920 one step in the clockwise direction away from its home position. When the operating element 920 of the group switch 902 is thus operated the first operating finger F921 is brought into alignment with the associated first bell crank L921 associated with the first group bar GB901.

At the conclusion of the third digit 1, the line relay R810 is maintained in its operated position thereby to maintain operated the hold relay R820, and to prevent further energization of the upper winding of the transfer relay R840 and further operation of the rotary magnet M929 of the group switch 902. When the operating element 920 of the group switch 902 is driven one step in the clockwise direction away from its home position the sets of switch springs GS801, GS804, GS952 and GS953 are actuated, for a purpose more fully explained hereinafter. More particularly, the set of switch springs GS801 is actuated into engagement thereby to complete an obvious circuit for operating the control relay R830. Also, the set of switch springs GS804 is actuated to interrupt, at the contacts 805 thereof, the previously traced circuit for energizing the lower winding of the transfer relay R840 and to prepare, at the contacts 806 thereof, a circuit, traced hereinafter, for energizing the lower winding of the transfer relay R850. Accordingly, shortly following the conclusion of the third digit 1, the transfer relay R840 restores since the previously traced circuit for energizing the lower winding thereof was interrupted incident to actuation of the set of switch springs GS804, and the previously traced circuit for energizing the upper winding thereof was interrupted when the line relay R810 was maintained in its operated position; the transfer relay being of the combination slow-to-operate and slow-to-release type, as previously noted. Upon restoring, the transfer relay R840 interrupts, at the contacts 841, a further point in the previously traced circuit for operating the rotary magnet M929 of the group switch 902 thereby positively to prevent further operation thereof; and interrupts, at the contacts 843, a further point in the previously traced circuit for energizing the upper winding of the transfer relay R840. Further, the transfer relay R840 prepares, at the contacts 842, a circuit, traced hereinafter, for energizing the upper winding of the transfer relay R850 and a multiple circuit for operating the rotary magnet M949 of the unit switch 903. Also, the transfer relay R840 completes, at the contacts 844, the previously mentioned circuit, including the contacts 822 and 832, the contacts 806 of the set of switch springs GS804, and the set of switch springs US803, for energizing the lower winding of the transfer relay R850, whereupon the latter relay operates shortly thereafter, it being of the combination slow-to-operate and slow-to-release type, as previously noted. Finally, the transfer relay R840 completes, at the contacts 845, a circuit, including the contacts 825 and the set of switch springs GS953, for operating the lift magnet M930 of the group switch 902. Upon operating, the lift magnet M930 slides longitudinally the operating element 920, whereby the first operating finger F921 operates the associated first bell crank L921 thereby to operate the first group bar GB901. When the first group bar GB901 is thus operated the first group of ten group contact sets GC911 to GC910, inclusive, is actuated into closed circuit position.

The subscriber at the calling subscriber substation B then dials the fourth digit 1 whereby the line relay R810 follows, restoring and then reoperating in accordance with the single impulse of the fourth digit 1. Upon restoring and then upon reoperating the line relay R810 interrupts and then recompletes, at the contacts 811, the previously mentioned circuit for maintaining operated the hold relay R820 during impulsing since it is of the combination slow-to-operate and slow-to-release type. Also, upon restoring and then upon operating the line relay R810 completes and then interrupts, at the contacts 812, the previously mentioned circuit, including the contacts 823, 842 and 855, for energizing the upper winding of the transfer relay R850, thereby to maintain the latter relay in its operated position during impulsing since it is of the combination slow-to-operate and slow-to-release type. Also, upon restoring and then upon reoperating the line relay R810 completes and then interrupts, at the contacts 812, the previously mentioned multiple circuit, including the contacts 823, 842 and 855, for operating the rotary magnet M949 of the unit switch 903. Upon operating, the rotary magnet M949 drives through the associated pawl and ratchet mechanism 947 the operating element 940 of the unit switch 903 one step in the counterclockwise direction away from its home position. When the operating element 940 is thus operated the first operating finger F941 operates the associated first unit contact set UC901 into closed circuit position, thereby to connect the busy relay R860 to the associated first bus which is, in turn, connected by the operated group contact set GC911 to the subscriber line 1211 extending to the called subscriber substation A. Further operation of the connector 800A depends upon the idle or busy condition of the called subscriber substation A; and, first assuming that the called subscriber substation A is busy at this time, ground potential appears upon the control conductor thereof completing a circuit for operating the busy relay R860. The circuit mentioned extends from the grounded control conductor of the subscriber line 1211 extending to the called subscriber substation A by way of the operated group ocntact set GC911, the associated first bus, the operated unit contact set UC901, the contacts 853, and the winding of R860 to battery. When the winding of the busy relay R860 is thus energized it operates to prepare, at the contacts 862, a holding circuit for energizing the winding thereof; and interrupts, at the contacts 863, a further point in a circuit traced hereinafter for energizing the upper winding of the switch relay R890. Also, the busy relay R860 prepares, at the contacts 861, a path for connecting the busy conductor C864 to one of the line conductors of the trunk T721. Also, when the operating element 940 of the unit switch 903 is driven one step in the counterclockwise direction the sets of switch springs US802, US803 and US951 are actuated, for a purpose more fully explained hereinafter. More particularly, the set of switch springs US802 is actuated into engagement, thereby to complete an obvious multiple circuit for maintaining operated the control relay R830; and the set of switch springs US803 is actuated into disengagement, thereby to interrupt the previously traced circuit for energizing the lower winding of the transfer relay R850.

Shortly following the conclusion of the fourth digit 1, the transfer relay R850 restores as it is of the combination slow-to-operate and slow-to-release type; the previously traced circuit for energizing the lower winding thereof being interrupted by virtue of the operated set of switch springs US803 and the previously traced circuit for energizing the upper winding being interrupted by virtue of the operated condition of the line relay R810. Upon restoring, the transfer relay R850 completes, at the contacts 854, the previously mentioned holding circuit, including the contacts 824 and 862, for maintaining operated the busy relay R860. Further, the transfer relay R850 completes, at the contacts 851, the previously mentioned connection, including the contacts 861 and the condenser 896, for connecting the busy conductor C864 to one of the line conductors of the trunk T721, whereby busy tone current is returned over the previously traced loop circuit to the calling subscriber substation B, thereby to indicate to the subscriber thereat that the present connection cannot be completed due to the busy condition of the called subscriber substation A. The subscriber at the calling subscriber substation B then replaces the receiver of the telephone instrument thereat upon its associated switchhook in order to effect the release of the connector 800A and the preceding elements of the switch train, in a manner substantially identical to that described hereinafter.

On the other hand, assuming that the subscriber line 1211 extending to the called subscriber substation A is idle when the first unit contact set UC901 is operated, in the manner previously explained, a path substantially identical to that previously traced is completed for short-circuiting the winding of the busy relay R860 since battery potential appears upon the control conductor of the subscriber line 1211. Shortly following the conclusion of the fourth digit 1, when the transfer relay R850 restores there is completed, at the contacts 852, a circuit for energizing the upper winding of the switch relay R890 since the busy relay R860 does not occupy its operated position. The above-mentioned circuit extends from ground by way of the contacts 824, the upper winding of R890, the contacts 894, 863 and 852, the operated unit contact set UC901, the associated first bus, and the operated group contact set GC911, to the control conductor of the subscriber line 1211 having battery potential thereon. Accordingly, the upper winding of the switch relay R890 is energized, causing the latter relay to operate in order to complete, at the contacts 895, a holding circuit, including the contacts 824, for energizing the lower winding thereof. Also, the switch relay R890 interrupts, at the contacts 894, the previously traced original circuit for energizing the upper winding thereof; and completes, at the contacts 893, a path, including the operated unit contact set UC901, the control conductor of the associated first bus and the operated group contact set GC911, for applying ground potential to the control conductor of the subsscriber line 1211, thereby to bring about operation of the cutoff relay in the line circuit 901 individual thereto, whereby the subscriber line 1211 is marked as busy to the other connectors in the group, including the connector 800A, having access thereto. Also the switch relay R890 completes, at the contacts 891 and 892, a circuit, including the contacts 881 and 883, for connecting the interrupter generator 886, the upper winding of the ring cutoff relay R880 and the battery 897, as well as the operated unit contact set UC901 and the operated group contact set GC911 across the line conductors of the subscriber line 1211, whereby ringing current is projected over the subscriber line 1211 to the called subscriber substation A. When the subscriber at the called subscriber substation A answers the call by removing the receiver of the telephone instrument thereat from its associated switchhook, a low resistance circuit identical to that traced above is completed for effectively energizing the upper winding of the ring cutoff relay R880, whereby the latter relay operates shortly thereafter, it being of the combination slow-to-operate and slow-to-release type. Upon operating, the ring cutoff relay R880 completes, at the contacts 885, a holding circuit, including the contacts 824, for energizing the lower winding thereof; and interrupts, at the contacts 881 and 883, the above-traced circuit for projecting ringing current over the subscriber line 1211 to the called subscriber substation A. Finally, the ring cutoff relay R880 completes, at the contacts 882 and 884, a loop circuit extending between the answer relay R870 in the connector 800A and the called subscriber substation A. The above-mentioned loop circuit extends from battery and ground potentials by way of the upper and lower windings of the answer relay R870, the contacts 882 and 884, the contacts 891 and 892, the operated unit contact set UC901, the operated group contact set GC911, and the line conductors of the subscriber line 1211 to the called subscriber substation A. When this loop circuit is completed the upper and lower windings of the answer relay R870 are energized therein, causing the latter relay to operate in order to complete, at the contacts 871 anud 872, a connection including the condensers 896 and 897 between the two loop circuits respectively extending from the calling subscriber substation B to the line relay R810 and from the called subscriber substation A to the answer relay R870. Accordingly, at this time a telephone connection is completed between the calling subscriber substation B and the called subscriber substation A for two-way conversation therebetween.

At the conclusion of the telephone connection, when the subscriber at the called subscriber substation A replaces the receiver of the telephone instrument thereat upon its associated switchhook, the previously traced loop circuit extending to the answer relay R870 is interrupted, thereby to cause the latter relay to restore and interrupt, at the contacts 871 and 872, the connection to the loop circuit extending from the calling subscriber substation B to the line relay R810 in the connector 800A. Subsequently, when the subscriber at the calling subscriber substation B replaces the receiver of the telephone instrument upon its associated switchhook, the previously traced loop circuit extending from the calling subscriber substation B to the line relay R810 in the connector 800A is interrupted, thereby to cause the latter relay to restore. Upon restoring, the line relay R810 interrupts, at the contacts 811, the previously mentioned circuit for maintaining operated the hold relay R820, whereby the latter relay restores shortly thereafter since it is of the combination slow-to-operate and slow-to-release type. Upon restoring, the hold relay R820 interrupts, at the contacts 821, the previously traced path for applying ground potential to the control conductor of the trunk T721, thereby to bring about the release of the second selector 600A, the first selector 400A, the finder 300A, and the cutoff relay R310 in the line circuit 301 individual to the subscriber line 312 extending to the calling subscriber substation B, as explained in detail hereinafter. Further, the hold relay R820 interrupts, at the contacts 824, the previously traced multiple holding circuits for energizing the lower windings of the ring cutoff relay R880 and the switch relay R890 in order to cause the switch relay R890 to restore immediately and the ring cut-off relay R880 to restore shortly thereafter, it being of the combination slow-to-operate and slow-to-release type. Upon restoring, the switch relay R890 interrupts, at the contacts 893, the previously traced path for applying ground potential to the control conductor of the subscriber line 1211 extending to the called subscriber substation A, thereby to bring about the release of the cutoff relay in the line circuit 901 individual to the subscriber line 1211, causing the subscriber line 1211 to be marked as idle to the connectors in the group, including the connector 800A, having access thereto. Also, upon restoring, the hold relay R820 interrupts, at the contacts 825, the circuit for maintaining operated the lift magnet M930 of the group switch 902 incorporated in the connector 800A, whereby the armature 932 is released causing the operating element 920 to be slid longitudinally back into its home position. Further, the hold relay R820 completes, at the contacts 826, a circuit, including the contacts 846, 857, 864 and 896, the set of switch springs GS952 and the contacts 933 and 934, for operating the rotary magnet M929. Upon operating, the rotary magnet M929 interrupts, at the contacts 934, the operating circuit therefor, whereby the rotary magnet M929 is operated buzzer-fashion to drive through the associated pawl and ratchet mechanism 927 the operating element 920 of the group switch 902 step by step in the clockwise direction back into its home position. When the operating element 920 of the group switch 902 is driven back into its home position, the sets of switch springs GS801, GS804, GS952 and GS953 are actuated. More particularly, the set of switch springs GS952 is actuated into disengagement, thereby to interrupt the previously traced circuit for operating the rotary magnet M929; the set of switch springs GS953 is actuated into disengagement, thereby to interrupt a further point in the previously traced circuit for operating the lift magnet M930; the set of switch springs GS804 is actuated in order to open the contacts 806 thereof and to close the contacts 805 thereof, in order respectively to interrupt a further point in the previously traced circuit for energizing the lower winding of the transfer relay R850 and to prepare a point in the previously traced circuit for energizing the lower winding of the transfer relay R840; and, finally, the set of switch springs GS801 is actuated into disengagement, thereby to interrupt one of the multiple circuits for maintaining operated the control relay R830.

Finally, upon restoring, the hold relay R820 completes, at the contacts 826, a multiple circuit, including the contacts 846, 857, 864 and 896, the set of switch springs US951 and the contacts 931 and 949', for operating the rotary magnet M949 of the unit 903. Upon operating, the rotary magnet M949 interrupts, at the contacts 949', the operating circuit therefor, whereby the rotary magnet M949 operates buzzer-fashion thereby to drive through the associated pawl and ratchet mechanism 947 the operating element 940 of the unit switch 903 step by step in the counterclockwise direction back into its home position. When the operating element 940 is driven back into its home position the sets of switch springs US802, US803 and US951 are actuated. More particularly, the set of switch springs US951 is actuated into disengagement, thereby to interrupt the previously traced circuit for operating the rotary magnet M949 of the unit switch 903. The set of switch springs US803 is actuated into engagement, thereby to prepare a further point in the previously traced circuit for energizing the lower winding of the transfer relay R850. Finally, the set of switch springs US802 is actuated into disengagement, thereby to interrupt the last holding circuit for maintaining operated the control relay R830 in order to cause the latter relay to restore. At this time both the group switch 902 and the unit switch 903 incorporated in the connector 800A are completely released and returned to their home positions, whereupon the two holding circuits for maintaining operated the control relay R830 are interrupted, causing the latter relay to restore. Upon restoring, the control relay R830 completes, at the contacts 831, the previously traced path including the contacts 805 of the set of switch springs GS804 for applying battery potential by way of the lower winding of the transfer relay R840 to the control conductor of the trunk T721, thereby to mark the trunk T721, and consequently the connector 800A, as idle to the second selectors in the two groups respectively including the second selectors 600A and 600B and the second selector 600C having access thereto, since the connector 800A is completely released and available for further use at this time.

When ground potential is removed from the control conductor of the trunk T721 the previously traced holding circuit for maintaining operated the switch relay R610 in the second selector 600A is interrupted, thereby to cause the latter relay to restore. Upon restoring, the switch relay R610 interrupts, at the contacts 618, the previously traced holding circuit for maintaining operated the lift magnet M730 of the group switch 702, thereby to cause the latter magnet to restore and release the armature 732 whereby the operating element 720 is slid longitudinally back into its home position. Also, upon restoring, the switch relay R610 completes, at the contacts 619, a circuit, including the contacts 622 and 636, the set of switch spring GS736, the contacts 729' and 645, for operating the rotary magnet M729 of the group switch 702. Upon operating, the rotary magnet M729 interrupts, at the contacts 729', the operating circuit therefor, whereby the rotary magnet M729 operates buzzer-fashion to drive through the associated pawl and ratchet mechanism 727 the operating element 720 step by step in the clockwise direction back into its home position. When the operating element 720 is driven back into its home position the sets of switch springs GS641, GS654 and GS736 are actuated. More particularly, the set of switch springs GS736 is actuated into disengagement, thereby to interrupt the circuit for operating the rotary magnet M729; the set of switch springs GS654 is actuated into disengagement, thereby to interrupt a further point in the previously traced circuit for operating the lift magnet M730; and the set of switch springs GS641 is actuated into engagement, thereby to complete the previously traced path for applying battery potential by way of the upper winding of the transfer relay R640 to the control conductor of the trunk T511. At this time the group switch 702 has been completely released and returned to its home positions; however, the unit switch 703 has no home position and is retained operated in its last stepped position. At this time the second selector 600A is completely released and is marked as being available for further use by the application of battery potential to the control conductor of the trunk T511, as previously noted; the second selector 600A being rendered selectable to the group of first selectors, including the first selector 400A.

When ground potential is removed from the control conductor of the trunk T511 the previously traced holding circuit for maintaining operated the switch relay R410 in the first selector 400A is interrupted, thereby to cause the latter relay to restore and interrupt, at the contacts 418, the previously traced circuit for maintaining operated the lift magnet M530 of the group switch 502, whereby the armature 532 thereof is released, causing the operating element 520 to be slid longitudinally back into its home position. Also, upon restoring, the switch relay R410 completes, at the contacts 419, a circuit, including the contacts 422 and 436, the set of switch springs GS536, the contacts 529' and 445, for operating the rotary magnet M529 of the group switch 502. Upon operating, the rotary magnet M529 interrupts, at the contacts 529', the operating circuit therefor, whereby the rotary magnet M529 operates buzzer-fashion to drive through the associated pawl and ratchet mechanism 527 the operating element 520 step by step in the clockwise direction back into its home position. When the operating element 520 is driven back into its home position, the sets of switch springs GS441, GS454 and GS536 are actuated. More particularly, the set of switch springs GS536 is actuated into disengagement, thereby to interrupt the operating circuit for the rotary magnet M529; the set of switch springs GS454 is actuated into disengagement, thereby to interrupt a further point in the previously traced circuit for operating the lift magnet M530; and the set of switch springs GS441 is actuated into engagement, thereby to prepare a further point in the previously traced circuit for energizing the upper winding of the transfer relay R440. Further, the switch relay R410 completes, at the contacts 419, a multiple circuit, including the contacts 442 and 436, the set of switch springs US550, the contacts 533 and 549', for operating the rotary magnet M549 of the unit switch 503 in the event the operating element 540 thereof does not occupy its home position at this time. In the peculiar event that the operating element 540 of the unit switch 503 occupies its home position at this time, the present example, the above-traced circuit for operating the rotary magnet M549 is not completed since the set of switch springs US550 has already been actuated into disengagement, preventing completion of the circuit for operating the rotary magnet M549. In the ordinary case, the circuit for operating the rotary magnet M549 is completed, causing the latter magnet to operate and interrupt, at the contacts 549', the operating circuit therefor; whereby the rotary magnet M549 operates buzzer-fashion to drive through the associated pawl and ratchet mechanism 547 the operating element 540 step by step in the counterclockwise direction back into its home position. When the operating element 540 is driven back into its home position the sets of switch springs US438 and US550 are actuated. More particularly, the set of switch springs US550 is actuated into disengagement, thereby to interrupt the circuit for operating the magnet M549; and the set of switch springs US438 is actuated into engagement, thereby to prepare a further point in the previously traced circuit for energizing the upper winding of the transfer relay R440. At this time the first selector 400A is completely released.

Also, when ground potential is removed from the control conductor of the trunk T511, the previously traced circuit for maintaining operated the cut-through relay R350 in the finder 300A is interrupted. Upon restoring, the cut-through relay R350 interrupts, at the contacts 356, the previously traced holding circuit for maintaining operated the lift magnet M330 of the group switch 302, to cause the latter magnet to release the armature 332 whereupon the operating element 320 is slid longitudinally back into its home position. Also, upon restoring, the cut-through relay R350 interrupts, at the contacts 355, the previously traced path for applying ground potential to the release conductor C1099 extending into the associated distributor 1000A. Upon restoring, the lift magnet M330 also prepares, at the contacts 333, a further point in the previously traced circuit for operating the rotary magnet M329 under the control of the associated distributor 1000A; and completes, at the contacts 334, the previously traced path, including the resistor 338, for applying battery potential to the guard conductor C1096 extending into the associated distributor 1000A. At this time the operating element 320 of the group switch 302 has been released and returned to its normal longitudinal position; and, since it has no rotary home position, there is no occasion for operation of the rotary magnet M329. Similarly, since the operating element 340 of the unit switch 303 has no rotary home position, there is no occasion for operation of the rotary magnet M349. Accordingly, at this time the finder 300A is completely released and marked as idle by the application of battery potential upon the guard conductor C1096 to the associated distributor 1000A.

Finally, when ground potential is removed from the control conductor of the trunk T511, the previously traced circuit for maintaining operated the cutoff relay R310 in the line circuit 301, individual to the subscriber line 312 extending to the subscriber substation B, is interrupted. The cutoff relay R310 then restores, thereby to recomplete, at the contacts 312 and 311, the normal connections to ground and battery potentials by way of the winding of the line relay R315 to the line conductors of the subscriber line 312 extending to the subscriber substation B. Further, the cutoff relay R310 interrupts, at the contacts 313, the connection between the control conductors C313 and C314 of the subscriber line 312, whereby battery potential is applied by way of the winding of the cutoff relay R310 and the contacts 317 to the control conductor C314 of the subscriber line 312, thereby to mark the subscriber line 312 as idle to the connectors in the associated group, including the connector 800A, having access thereto. At this time the connection is completely released and all of the switching apparatus involved therein has been returned to its normal position and is available for further use.

In view of the foregoing, it is apparent that there has been provided a telephone system comprising finders, selectors and connectors, each incorporating improved switching apparatus in the form of a unitary group switch and a unitary unit switch.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Switching apparatus comprising a plurality of groups of lines, a plurality of members respectively associated with said groups of lines, a plurality of busses, each of said members being operative to connect the individual lines in the associated group respectively to said busses, an element commonly associated with said members and mounted for selective movement in a first direction and for movement in a second direction, means for imparting selective movement in said first direction and movement in said second direction to said element, means controlled by selective movement in said first direction of said element for selecting any given one of said members, means controlled by movement in said second direction of said element for operating the selected one of said members, a plurality of contact sets respectively associated with said busses, a trunk, each of said contact sets being operative to connect the associated bus to said trunk, a spindle commonly associated with said contact sets and mounted for selective rotary movement, means for imparting selective rotary movement to said spindle, and means controlled by selective rotary movement of said spindle for operating any given one of said contact sets.

2. In a telephone system including a plurality of groups of lines and a trunk; switching apparatus comprising a unitary group switch, a plurality of busses, and a unitary unit switch; said group switch including a first magnet selectively operative to select any given one of said groups of lines, and means for connecting the individual lines in said selected one group of lines respectively to said busses; said unit switch including a second magnet selectively operative to select any given one of said busses, and means for connecting said selected one bus to said trunk; means responsive to a call on one line in one of said groups of lines for selectively operating said first magnet to select said one group of lines and for selectively operating said second magnet to select the one of said busses to which said one line is connected.

3. In a telephone system including a trunk and a plurality of groups of lines; switching apparatus comprising a plurality of members respectively associated with said groups of lines, a plurality of busses, each of said members being operative to connect the individual lines in the associated group respectively to said busses, an element commonly associated with said members and mounted for selective movement in a first direction and for movement in a second direction, means controlled by selective movement in said first direction of said element for selecting any given one of said members, means controlled by movement in said second direction of said element for operating the selected one of said members, a plurality of contact sets respectively associated with said busses, each of said contact sets being operative to connect the associated bus to said trunk, a spindle commonly associated with said contact sets and mounted for selective rotary movement, and means controlled by selective rotary movement of said spindle for operating any given one of said contact sets; means responsive to a call on one line in one of said groups of lines for imparting selective movement in said first direction to said element to select the one of said members associated with said one group of lines and then for imparting movement in said second direction to said element and then for imparting selective rotary movement to said spindle to operate the one of said contact sets associated with the one of said busses to which said one line is connected.

4. In a telephone system including a plurality of groups of lines and a trunk; switching apparatus comprising a unitary group switch, a plurality of busses, and a unitary unit switch; said group switch including a first stepping magnet selectively operative to select any given one of said groups of lines, and switching means operative to connect the individual lines in said selected one group of lines respectively to said busses; said unit switch including a second stepping magnet selectively operative to select any given one of said busses and to connect said selected one bus to said trunk; means including a line relay responsive to the impulses of a digit transmitted over said trunk for repeating corresponding impulses to said first stepping magnet in order to control operation thereof to select the corresponding one of said groups of lines; means controlled following operation of said first stepping magnet for operating said switching means and for transmitting impulses to said second stepping magnet in order to control selective operation thereof; and testing means for governing said impulse transmitting means in order to effect operation of said second stepping magnet to select one of said busses to which an idle line in said one group of lines is connected and to connect said selected one bus to said trunk.

5. In a telephone system including a trunk and a plurality of groups of lines; switching apparatus comprising a plurality of members respectively associated with said groups of lines, a plurality of busses, each of said members being operative to connect the individual lines in the associated group respectively to said busses, an element commonly associated with said members and mounted for selective movement in a first direction and for movement in a second direction, means controlled by selective movement in said first direction of said element for selecting any given one of said members, means controlled by movement in said second direction of said element for operating the selected one of said members, a plurality of contact sets respectively associated with said busses, each of said contact sets being operative to connect the associated bus to said trunk, a spindle commonly associated with said contact sets and mounted for selective rotary movement, and means controlled by selective rotary movement of said spindle for operating any given one of said contact sets; means responsive to a digit received over said trunk for imparting corresponding selective movement in said first direction to said element to select the corresponding one of said members and then for imparting movement in said second direction to said element; and means for imparting selective rotary movement to said spindle to operate one of said contact sets associated with one of said busses to which there is connected an idle line in the one of said groups of lines associated with said selected one member.

6. In a telephone system including a plurality of groups of lines; switching apparatus comprising a unitary group switch having a normal position and selectively operative away therefrom to select any given one of said groups of lines, and a unitary unit switch having no normal position and selectively operative from its last operated position, if necessary, to select an idle line in the previously selected group of lines; means for seizing said switching apparatus and for selectively operating said group switch away from its normal position to select any given one of said groups of lines; and testing means for selectively controlling operation of said unit switch away from its last operated position, if necessary, to select an idle line in said previously selected one group of lines.

7. In a telephone system including a plurality of groups of lines; switching apparatus comprising a unitary group switch having a normal position and selectively operative away therefrom to select any given one of said groups of lines, and a unitary unit switch having no normal position and selectively operative from its last operated position, if necessary, to select an idle line in the previously selected group of lines; means for seizing said switching apparatus and for selectively operating said group switch away from its normal position to select any given one of said groups of lines; testing means for selectively controlling operation of said unit switch away from its last operated position, if necessary, to select an idle line in said previously selected one group of lines; means for releasing said switching apparatus; and means responsive to the release of said switching apparatus for restoring only said group switch from its operated position to its normal position.

8. In a telephone system including a trunk and a plurality of groups of lines; switching apparatus comprising a unitary group switch selectively operative to select any given one of said groups of lines, and a unitary unit switch selectively operative to select an idle line in the previously selected group of lines; means controllable over said trunk for selectively operating said group switch to select any given one of said groups of lines; means for initiating operation of said unit switch to select successively the lines in said previously selected one group of lines; means including a tester for testing the lines in said one group as they are selected by said unit switch and for arresting operation of said unit switch when an idle line is selected thereby; and additional means controlled by continued operation of said unit switch after each line in said one group has been tested as being busy at least once by said tester for arresting operation thereof and for returning a busy signal over said trunk.

9. In a telephone system including a plurality of groups of lines and a trunk; switching apparatus comprising a unitary group switch, a plurality of busses, and a unitary unit switch; said group switch including a first stepping magnet selectively operative to select any given one of said groups of lines, and means for connecting the individual lines in said selected one group of lines respectively to said busses; said unit switch including a second stepping magnet selectively operative to select any given one of said busses, and means for connecting said selected one bus to said trunk; means including a line relay responsive to the impulses of first and second digits transmitted over said trunk for repeating a corresponding first series of impulses to said first stepping magnet in order to control operation thereof to select the corresponding one of said groups of lines and for repeating a corresponding second series of impulses to said second stepping magnet in order to control operation thereof to select the corresponding one of said busses.

10. In a telephone system including a trunk and a plurality of groups of lines; switching apparatus comprising a plurality of members respectively associated with said groups of lines, a plurality of busses, each of said members being operative to connect the individual lines in the associated group respectively to said busses, an element commonly associated with said members and mounted for selective movement in a first direction and for movement in a second direction, means controlled by selective movement in said first direction of said element for selecting any given one of said members, means controlled by movement in said second direction of said element for operating the selected one of said members, a plurality of contact sets respectively associated with said busses, each of said contact sets being operative to connect the associated bus to said trunk, a spindle commonly associated with said contact sets and mounted for selective rotary movement, and means controlled by selective rotary movement of said spindle for operating any given one of said contact sets; means responsive to a first digit received over said trunk for imparting corresponding selective movement in said first direction to said element to select the corresponding one of said members and then for imparting movement in said second direction to said element; and means responsive to a second digit received over said trunk for imparting corresponding selective rotary movement to said spindle.

11. In a telephone system including first and second lines, first and second automatic switches respectively associated with said first and second lines, first and second groups of automatic switches respectively accessible to said first and second switches, and a third automatic switch commonly accessible to said first and second switches; said first and second switches each including a unitary group mechanism and a unitary unit mechanism, means controllable over said first line for operating the group mechanism in said first switch to select said first group of switches and said third switch, means controlled by the operation of said group mechanism in said first switch for initiating operation of the unit mechanism therein to select an idle switch in said first group or to select said third switch in the event it is idle and all of the switches in said first group are busy, means included in said first switch and governed in the further event said third switch is also busy for returning a busy signal over said first line, means controllable over said second line for operating the group mechanism in said second switch to select said second group of switches and said third switch, means controlled by the operation of said group mechanism in said second switch for initiating operation of the unit mechanism therein to select an idle switch in said second group or to select said third switch in the event it is idle and all of the switches in said second group are busy, means included in said second switch and governed in the further event said third switch is also busy for returning a busy signal over said second line.

12. A unitary switch comprising a group of longitudinally extending contact strips, the individual contact strips in said group being laterally spaced apart, a plurality of longitudinally spaced apart groups of contact members commonly associated with said group of contact strips, the individual contact members in each of said groups being laterally spaced apart and respectively associated with the individual contact strips in said group, a plurality of operating members respectively associated with said groups of contact members, each of said operating members being movable to actuate the individual contact members in the associated group into engagement with the individual contact strips in said group, a longitudinally extending operating element commonly associated with said operating members and mounted for both selective rotary movement and longitudinal sliding movement, a plurality of longitudinally spaced apart clutch elements commonly associated with said operating element and respectively associated with said operating members, said clutch elements being sequentially operated to clutch and to declutch said operating members to said operating element as said operating element is selectively rotated, means for imparting selective rotary movement to said operating element in order to operate the associated one of said clutch elements to clutch any given one of said operating members to said operating element, and means for imparting longitudinal sliding movement to said operating element in order to move the one of said operating members clutched thereto.

13. A unitary switch comprising a group of longitudinally extending contact strips, the individual contact strips in said group being laterally spaced apart, a plurality of longitudinally spaced apart groups of contact members commonly associated with said group of contact strips, the individual contact members in each of said groups being laterally spaced apart and respectively associated with the individual contact strips in said group, a plurality of operating members respectively associated with said groups of contact members, each of said operating members being movable to actuate the individual contact members in the associated group into engagement with the individual contact strips in said group, a longitudinally extending operating element commonly associated with said operating members and mounted for both selective rotary movement and longitudinal sliding movement, a plurality of longitudinally spaced apart operating lugs carried by said operating element and respectively associated with said operating members, said operating lugs being angularly spaced apart so that they are sequentially brought into operative relation with respect to said operating members as said operating element is selectively rotated, means for imparting selective rotary movement to said operating element in order to bring the associated one of said operating lugs into operative relation with any given one of said operating members, and means for imparting longitudinal movement to said operating element, thereby to move the one of said operating members disposed in operative relation with the associated one of said lugs carried by said operating element.

CLARENCE E. LOMAX.
HANS SENGEBUSCH.

REFERENCES CITED

The following references are of record in the file of this patent:

UNITED STATES PATENTS

| Number | Name | Date |
|---|---|---|
| 1,029,591 | Clement | June 18, 1912 |
| 1,480,202 | Goodrum | Jan. 8, 1924 |
| 1,728,348 | Lienzen | Sept. 17, 1929 |
| 2,238,458 | Waller | Apr. 15, 1941 |
| 2,289,896 | Bakker | July 14, 1942 |
| 2,384,620 | Hersey | Sept. 11, 1945 |